United States Patent
Nakamura et al.

(10) Patent No.: US 9,505,088 B2
(45) Date of Patent: Nov. 29, 2016

(54) FLUX-CORED WIRE, WELDING METHOD USING FLUX-CORED WIRE, METHOD FOR MANUFACTURING WELD JOINT USING FLUX-CORED WIRE, AND WELD JOINT

(71) Applicant: NIPPON STEEL & SUMITOMO METAL CORPORATION, Tokyo (JP)

(72) Inventors: Shuichi Nakamura, Renens (CH); Yasuhito Totsuka, Chiba (JP); Kazuhiro Kojima, Chiba (JP); Ryuichi Shimura, Kimitsu (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 0 days.

(21) Appl. No.: 14/764,126

(22) PCT Filed: Nov. 6, 2013

(86) PCT No.: PCT/JP2013/080005
§ 371 (c)(1),
(2) Date: Jul. 28, 2015

(87) PCT Pub. No.: WO2014/119082
PCT Pub. Date: Aug. 7, 2014

(65) Prior Publication Data
US 2015/0360327 A1    Dec. 17, 2015

(30) Foreign Application Priority Data
Jan. 31, 2013    (JP) ................. 2013-017604

(51) Int. Cl.
*B23K 35/02* (2006.01)
*B23K 35/368* (2006.01)
(Continued)

(52) U.S. Cl.
CPC ............... *B23K 35/368* (2013.01); *B23K 9/02* (2013.01); *B23K 9/173* (2013.01); *B23K 9/23* (2013.01);
(Continued)

(58) Field of Classification Search
CPC ............ B23K 35/368; B23K 35/3093; B23K 35/3601; B23K 35/0266; B23K 9/173; B23K 35/362; B23K 35/3603; B23K 35/3605; B23K 35/0255; B23K 35/0261; B23K 35/3602
USPC .......... 219/69.1, 73, 145.22, 145.23, 146.22; 148/23, 24, 26
See application file for complete search history.

(56) References Cited

U.S. PATENT DOCUMENTS 4,355,054 A * 10/1982 Nagano ................ B23K 35/404
427/126.2
5,233,160 A * 8/1993 Gordish ............... B23K 35/368
219/137 WM (Continued)

FOREIGN PATENT DOCUMENTS

CN    101073863 A    11/2007
CN    101104232 A    1/2008
(Continued)

OTHER PUBLICATIONS

International Search Report, issued in PCT/JP2013/080005, dated Jan. 28, 2014.
(Continued)

*Primary Examiner* — Thien S Tran
(74) *Attorney, Agent, or Firm* — Birch, Stewart, Kolasch & Birch, LLP

(57) ABSTRACT

In a flux-cored wire according to the present invention, $CaF_2$ and the like are included and a total amount thereof α is 3.3 to 6.0% in terms of mass % with respect to a total mass, Ti oxide and the like are included and a total amount thereof β is 0.4 to 1.2% in terms of mass % with respect to the total mass, $CaCO_3$ and the like are included and a total amount thereof is 0.1 to 0.5% in terms of mass % with respect to the total mass, and an amount of an iron powder in the flux is less than 10% in terms of mass % with respect to the total mass.

20 Claims, 2 Drawing Sheets

(51) Int. Cl.
| | |
|---|---|
| B23K 35/30 | (2006.01) |
| B23K 35/36 | (2006.01) |
| B23K 35/362 | (2006.01) |
| C22C 38/04 | (2006.01) |
| C22C 38/08 | (2006.01) |
| C22C 38/12 | (2006.01) |
| C22C 38/14 | (2006.01) |
| B23K 9/02 | (2006.01) |
| B23K 9/173 | (2006.01) |
| B23K 9/23 | (2006.01) |
| C22C 38/00 | (2006.01) |
| C22C 38/02 | (2006.01) |
| C22C 38/06 | (2006.01) |
| C22C 38/16 | (2006.01) |
| C22C 38/40 | (2006.01) |
| C22C 38/42 | (2006.01) |
| C22C 38/44 | (2006.01) |
| C22C 38/46 | (2006.01) |
| C22C 38/48 | (2006.01) |
| C22C 38/50 | (2006.01) |
| C22C 38/54 | (2006.01) |
| C22C 38/58 | (2006.01) |

(52) U.S. Cl.
CPC ....... *B23K 35/0244* (2013.01); *B23K 35/0255* (2013.01); *B23K 35/0261* (2013.01); *B23K 35/0266* (2013.01); *B23K 35/3053* (2013.01); *B23K 35/3066* (2013.01); *B23K 35/362* (2013.01); *B23K 35/3602* (2013.01); *B23K 35/3605* (2013.01); *B23K 35/3606* (2013.01); *C22C 38/002* (2013.01); *C22C 38/004* (2013.01); *C22C 38/005* (2013.01); *C22C 38/02* (2013.01); *C22C 38/04* (2013.01); *C22C 38/06* (2013.01); *C22C 38/08* (2013.01); *C22C 38/12* (2013.01); *C22C 38/14* (2013.01); *C22C 38/16* (2013.01); *C22C 38/40* (2013.01); *C22C 38/42* (2013.01); *C22C 38/44* (2013.01); *C22C 38/46* (2013.01); *C22C 38/48* (2013.01); *C22C 38/50* (2013.01); *C22C 38/54* (2013.01); *C22C 38/58* (2013.01); *Y10T 403/479* (2015.01)

(56) References Cited

U.S. PATENT DOCUMENTS

| | | | |
|---|---|---|---|
| 2001/0038001 A1* | 11/2001 | Morikage | B23K 35/3086 219/137 WM |
| 2003/0015257 A1 | 1/2003 | Kim et al. | |
| 2004/0020912 A1* | 2/2004 | Hara | B23K 35/3053 219/145.22 |
| 2012/0241433 A1 | 9/2012 | Kojima et al. | |

FOREIGN PATENT DOCUMENTS

| | | | |
|---|---|---|---|
| CN | 102655978 A | | 9/2012 |
| EP | 0 563 886 A1 | | 10/1993 |
| EP | 2 289 661 A1 | | 3/2011 |
| JP | 1-271098 A | | 10/1989 |
| JP | 3-294093 A | | 12/1991 |
| JP | 6-155079 A | | 6/1994 |
| JP | 06-277877 A | * | 10/1994 |
| JP | 8-197283 A | | 8/1996 |
| JP | 8-257785 A | | 10/1996 |
| JP | 2003-33895 A | | 2/2003 |
| JP | 2008-168312 A | | 7/2008 |
| JP | 2009-248175 A | | 10/2009 |
| JP | 2011-20154 A | | 2/2011 |
| WO | WO 2011/074689 A1 | | 6/2011 |

OTHER PUBLICATIONS

Written Opinion of the International Searching Authority, issued in PCT/JP2013/080005, dated Jan. 28, 2014.
Chinese Office Action dated Mar. 4, 2016, issued in Chinese Patent Application No. 201380071725.3.
Extended European Search Report dated Jun. 1, 2016 issued in European Patent Application No. 13873656.6.

* cited by examiner

FLUX-CORED WIRE, WELDING METHOD USING FLUX-CORED WIRE, METHOD FOR MANUFACTURING WELD JOINT USING FLUX-CORED WIRE, AND WELD JOINT

TECHNICAL FIELD

The present invention relates to a flux-cored wire used for welding a high strength steel having 780 MPa or more of tensile strength, and particularly relates to a flux-cored wire which can omit or remarkably reduce preheating for cold cracking preventing and which can obtain a weld metal excellent in low-temperature toughness. In addition, the present invention relates to a welding method using the flux-cored wire, a method for manufacturing weld joint using the flux-cored wire, and a weld joint.

Priority is claimed on Japanese Patent Application No. 2013-017604, filed on Jan. 31, 2013, the content of which is incorporated herein by reference.

RELATED ART

Recently, demand has been growing for an increase in size and height of architectural construction such as building, bridge, and the like. According to such demand, a 780 MPa-class high strength steel (tensile strength is 780 MPa or more) or a high strength steel having higher tensile strength has been used.

The reason why the high strength steel is used is that the high strength steel reduces an amount of use of steel to reduce a cost of the steel and a cost of carrying, and that the high strength steel is thin and reduces the weight of the steel. Therefore, handling of the steel become easy and an amount of welding is reduced, and thus, shorten the construction period and reducing construction cost are expected.

However, although the demand for using the high strength steel has been growing, rate of consumed amount of the 780 MPa-class high strength steel to entire amount is very low.

Because, the higher the strength of the steel is, the higher the weld cracking susceptibility is. Preheating is necessary for suppressing the weld cracking, and thus, there is an problem that using the high strength steel deteriorates efficiency of welding procedure and does not contribute to shortening the construction period and reducing construction cost.

In addition, when an off shore structure for developing oil and natural gas fields and pipeline transporting the oil and natural gas are installed in a low temperature environment such as the North Sea, Sakhalin, and the like, very high low-temperature toughness is in demand for the steel and welding material used therein. The higher the strength of the steel is, the more difficult securing the strength and the low-temperature toughness of the weld portion, and thus, the 780 MPa-class high strength steel is not used.

Accordingly, for widely use of the 780 MPa-class high strength steel, a flux-cored wire which can omit or remarkably reduce preheating and which can obtain a weld portion excellent in low-temperature toughness is earnestly desired.

A wire in which fluoride is added in flux as a slag forming agent has been proposed as a flux-cored wire by which high toughness weld metal can be obtained (For example, see Patent Documents 1 to 7).

These documents disclose that the fluoride rises basicity of molten pool to reduce an amount of oxygen in the weld metal, and thus, high low-temperature toughness can be obtained. On the other hand, a main target of all of the Patent Documents 1 to 4 is welding a steel sheet of which the strength level is not cause weld cracking, and the Patent Documents 1 to 4 do not examine cold cracking of the weld metal.

The Patent Document 5 proposes a flux-cored wire for 490 to 780 MPa-class high tensile strength steel in which an amount of V is further optimized and diffusible hydrogen is occluded in V to improve cold crack resistance, and thus, preheating temperature for stopping weld cracking is 50° C. or less despite that the wire is 780 MPa-class wire. On the other hand, although the weld metal needs further high toughness in welding 780 MPa-class or more of steel, Patent Document 5 does not examine about the toughness of the weld metal.

The Patent Document 6 proposes a wire in which CaO is added as an essential composition to adjust melting point of slag, which realize vertical welding and upward welding, and an amount of oxygen in the weld metal is reduced to improve toughness. In addition, the Patent Document 7 proposes a wire in which CaO is added as an essential composition to decrease the amount of oxygen and to prevent the toughness of the weld metal from deteriorating after PWHT. On the other hand, both of Patent Documents 6 and 7 do not examine about low-temperature toughness severely desired for weld portion of the 780 MPa-class or more of high strength steel and about cold crack resistance.

PRIOR ART DOCUMENTS

Patent Documents

[Patent Document 1] Japanese Unexamined Patent Application, First Publication No. H1-271098
[Patent Document 2] Japanese Unexamined Patent Application, First Publication No. H3-294093
[Patent Document 3] Japanese Unexamined Patent Application, First Publication No. H6-155079
[Patent Document 4] Japanese Unexamined Patent Application, First Publication No. H8-197283
[Patent Document 5] Japanese Unexamined Patent Application, First Publication No. H8-257785
[Patent Document 6] PCT International Publication No. WO2011/074689
[Patent Document 7] Japanese Unexamined Patent Application, First Publication No. 2011-020154

SUMMARY OF INVENTION

Technical Problem

An object of the present invention is to extremely improve efficiency of welding procedure for 780 MPa-class or more of high strength steel by providing a flux-cored wire, which can obtain high strength and high toughness weld portion during welding 780 MPa or more of high strength steel and is excellent in cold crack resistance, and which can omit or remarkably reduce preheating for suppressing cold cracking. In addition, an object of the present invention is to provide a welding method using the flux-cored wire, a method for manufacturing weld joint using the flux-cored wire, and a weld joint.

Solution to Problem

Conventionally, fluoride has been used in a flux-cored wire for a steel of which strength level is low to obtain high toughness weld metal. On the other hand, an affection of the fluoride for cold crack resistance has not been examined.

The inventor focused the fluoride and studied, and thus, the inventor found a slag composition optimal for extremely reducing diffusible hydrogen in the weld metal and for securing the low-temperature toughness in the flux-cored wire used for welding 780 MPa or more of high strength steel.

In addition, it was found that including Mo for enhance equilibrium of strength and toughness of the weld metal and optimizing an amount of Mn and Ni is effective for a flux-cored wire in which structure of the weld metal is mainly bainite, the level of the tensile strength of the weld metal is 780 MPa to 940 MPa, and flux therein is mainly fluoride.

Accordingly, the inventors found a flux-cored wire which can obtain weld metal excellent in strength and low-temperature toughness during welding high strength steel having 780 MPa or more of tensile strength and can omit or remarkably simplify preheating performed for suppressing cold cracking. Moreover, the inventors obtained the present invention by further examine about the findings described above.

The gist of the present invention is as follows.

(1) A flux-cored wire according to one embodiment of the present invention includes an outer steel sheath; and a flux with which the outer steel sheath is filled, wherein one or more of $CaF_2$, $BaF_2$, $SrF_2$, $MgF_2$, and LiF are included in the flux and, when a total amount thereof is defined as α, the α is 3.3 to 6.0% in terms of mass % with respect to a total mass of the flux-cored wire, one or more of a Ti oxide, a Si oxide, a Zr oxide, a Mg oxide, and an Al oxide are included in the flux and, when a total amount thereof is defined as β, the β is 0.4 to 1.2% in terms of mass % with respect to the total mass of the flux-cored wire, one or more of $CaCO_3$, $BaCO_3$, $SrCO_3$, $MgCO_3$, and $Li_2CO_3$ are included in the flux and a total amount thereof is 0.1 to 0.5% in terms of mass % with respect to the total mass of the flux-cored wire, an amount of an iron powder in the flux is less than 10% in terms of mass % with respect to the total mass of the flux-cored wire, a chemical composition excluding a fluoride, a metal oxide, and a metal carbonate includes, in terms of mass % with respect to the total mass of the flux-cored wire, C: 0.04 to 0.09%; Si: 0.3 to 1.0%; Mn: 1.0 to 2.5%; Al: 0.001 to 0.050%; Ni: 1.5 to 3.5%; V: 0 to 0.04%; P: 0.02% or less; S: 0.02% or less; Cu: 0 to 0.5%; Cr: 0 to 0.5%; Mo: 0.3 to 1.0%; Ti: 0 to 0.30%; Nb: 0 to 0.10%; B: 0 to 0.0100%; Ca: 0 to 0.50%; REM: 0 to 0.0100%; and a remainder including Fe and an impurity, a Ceq defined by the below expression a is 0.60 to 1.20 mass %, a TE defined by the below expression b is 2.9 to 4.4 mass %, Ceq="C"+"Si"/24+"Mn"/6+"Ni"/40+"Cr"/5+"Mo"/4+"V"/14:     Expression a, TE="Mn"/2+"Ni"+3×"Cr":     Expression b, and elements to which double quote is attached express amounts of the elements in terms of mass %.

(2) In the flux-cored wire according to (1), an amount of CaO in the flux-cored wire may be 0.15% or less in terms of mass % with respect to the total mass of the flux-cored wire.

(3) In the flux-cored wire according to (1) or (2), wherein a ratio of an amount of the $CaF_2$ with respect to the α may be 0.90 or more.

(4) In the flux-cored wire according to any one of (1) to (3), a ratio of the α with respect to the β may be 3.1 to 15.0.

(5) In the flux-cored wire according to any one of (1) to (4), a tensile strength of a deposited metal may be 780 MPa to 940 MPa in a tensile test to the deposited metal regulated in Japanese Industrial Standards JIS Z 3111-2005 with respect to the gas-shielded arc welding using the flux-cored wire.

(6) In the flux-cored wire according to any one of (1) to (5), the outer steel sheath may have a seamless shape.

(7) In the flux-cored wire according to any one of (1) to (6), a perfluoropolyether oil may be applied on a surface of the flux-cored wire.

(8) In a welding method according to other embodiment of the present invention, a steel is welded with the flux-cored wire according to any one of (1) to (7), and with a pure Ar gas, a pure carbon dioxide, or a mixed gas of Ar and 3 to 30 volume % of $CO_2$ as a shielding gas.

(9) In a method for manufacturing a weld joint according to other embodiment of the present invention, a thickness of the steel is 3 to 100 mm, a tensile strength of the steel is 780 MPa or more, and welding is performed with the welding method according to (8).

(10) A weld joint according to other embodiment of the present invention includes the steel of which the thickness is 3 to 100 mm and of which the tensile strength is 780 MPa or more; and a weld metal, wherein the weld joint is manufactured by the method for manufacturing the weld joint according to (9).

(11) In the weld joint according to (10), an amount of a diffusible hydrogen in the weld metal may be less than 1.0 ml/100 g, an amount of an oxygen in the weld metal may be 300 to 400 ppm, tensile strength of the weld metal may be 780 to 940 MPa, and a charpy absorbed energy at −40° C. of the weld metal may be 86 $J/cm^2$ or more.

Effect of the Invention

The present invention can provide a flux-cored wire for welding high strength steel having 780 MPa or more of tensile strength, which is excellent in toughness of the weld metal and which can omit or remarkably reduce preheating for cold cracking preventing.

EMBODIMENTS OF THE INVENTION

Figure 1:
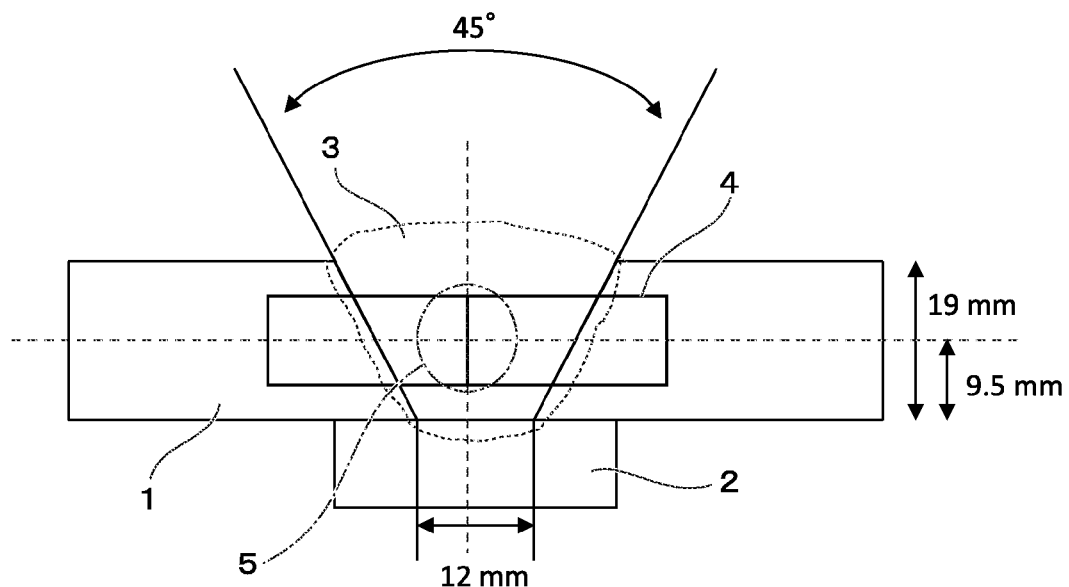
FIG. 1 A figure showing a collection position of test piece in examples.

Conventionally, it is assumed that fluoride has an effect of rising basicity of molten pool to decrease an amount of oxygen of a weld metal. Inventors further studied an effect of the fluoride with respect to hydrogen in the weld metal in detail by manufacturing of a variety of trial flux-cored wire.

That is, trial flux-cored wires which included metal fluoride such as $CaF_2$, metal oxide, and metal carbonate such as $CaCO_3$ as well as alloy components of Ni for securing toughness and Mo for securing reheat embrittlement resistance at multi-layer welding, in which amounts of the metal fluoride were changed at various rates, and in which total amounts of hydrogen included therein were controlled, were manufactured. Welding 780 MPa-class high strength steel was performed using the various flux-cored wires.

As a result, the inventors found that, when a total amount of the metal fluoride such as $CaF_2$ was within a certain range, an amount of diffusible hydrogen in the weld metal was limited to less than 1.0 ml/100 g and cold crack resistance remarkably increased. In addition, the inventors found that it was important for securing a weld metal having high strength and excellent low-temperature toughness at welding 780 MPa-class high strength steel that a total amount TE of ½ times of an amount of Mn, an amount of Ni, and three times of an amount of Cr was within a certain range and that Mo was included in the flux-cored wire from the result of a similar investigation.

The present invention has been made based on the results of the above investigations. Hereinafter, a reason for limitation in technical requirements which are features of the flux-cored wire according to the present invention and preferable embodiments of the flux-cored wire according to the present invention are successively explained.

At first, reasons for limitation in alloy compositions and metal deoxidizing compositions included in an outer steel sheath and a flux by which the flux-cored wire according to the present embodiment is constructed, and for limitation in amounts of each composition are explained.

In the descriptions below, unless otherwise specified, "%" means "mass %" and amounts of each composition mean a composition amount which is total mass % of each composition in the outer steel sheath and the flux with respect to a total mass of the flux-cored wire.

(C: 0.04 to 0.09%)

C is an element increasing strength of the weld metal. In order to set the tensile strength of the weld metal as 780 MPa or more, it is necessary that a lower limit of an amount of C is 0.04%. In order to further increase the strength of the weld metal, the lower limit of the amount of C may be 0.045%, 0.05%, or 0.055%.

The more the amount of C in the weld wire (flux-cored wire) is, the more the amount of C in the weld metal is and the higher the strength of the weld metal is, and thus, it is preferable. On the other hand, if the amount of C is excess, the toughness of the weld metal is deteriorated and both of hot cracking susceptibility and cold cracking susceptibility increase. Therefore, the upper limit of the amount of C is 0.09% to secure the toughness and weld cracking resistance of the weld metal. In addition, the upper limit of C may be 0.08%, 0.075%, or 0.07% to stably secure low-temperature toughness.

(Si: 0.3 to 1.0%)

Si is a deoxidizing element and decreases an amount of O in the weld metal to enhance cleanliness. It is necessary for obtaining the effect that the lower limit of the amount of Si is 0.3%. On the other hand, if more than 1.0% of Si is included, the toughness of the weld metal is deteriorated, and thus, the upper limit of the amount of Si is 1.0%. In order to sufficiently reduce the amount of O in the weld metal, the lower limit of the amount of Si may be 0.35%, 0.4%, or 0.45%. Moreover, in order to stably secure the toughness of the weld metal, the upper limit of the amount of Si may be 0.8%, 0.7%, or 0.6%.

(Mn: 1.0 to 2.5%)

Mn is an element necessary for securing hardenability of the weld metal to enhance the strength. In order to surely exert the effect, it is necessary that the lower limit of the amount of Mn is 1.0%. On the other hand, if more than 2.5% of Mn is included, intergranular embrittlement susceptibility increases and the toughness of the weld metal is deteriorated, and thus, the upper limit of the amount of Mn is 2.5%. In order to enhance the strength of the weld metal more stably, the lower limit of the amount of Mn may be 1.1%, 1.2%, 1.4%, or 1.6%. In order to further enhance the toughness of the weld metal, the upper limit of the amount of Mn may be 2.3%, 2.1%, 2.0%, or 1.9%.

(P: 0.02% or Less)

P is an impurity element. If P exists excessively in the weld metal, P deteriorates both of the toughness and the ductility of the weld metal, and thus, it is preferable that the amount of P is minimized. The amount of P is in a range of 0.02% or less of which the adverse effect for the toughness and the ductility is acceptable. In order to stably prevent the toughness and the ductility of the weld metal from decrease, it is preferable that the amount of P be 0.017% or less, 0.015% or less, 0.012% or less, or 0.01% or less. It is not necessary to define a lower limit of P. The lower limit of P may be 0%.

(S: 0.02% or Less)

S is also an impurity element. If S exists excessively in the weld metal, S deteriorates both of the toughness and the ductility of the weld metal, and thus, it is preferable that the amount of S is minimized. The amount of S is in a range of 0.02% or less, as the adverse effect for the toughness and the ductility caused by the range is acceptable. In order to stably prevent the toughness and the ductility of the weld metal from deterioration, it is preferable that the amount of S is 0.017% or less, 0.015% or less, 0.012% or less, or 0.01% or less. It is not necessary to define a lower limit of S. The lower limit of S may be 0%.

(Al: 0.001 to 0.050%)

Al is a deoxidizing element and has an effect of decreasing the amount of O in the weld metal and an effect of enhancing the cleanliness of the weld metal, as well as Si. In order to exert the effect, it is necessary that the lower limit of the amount of Al is 0.001%. On the other hand, if more than 0.050% of Al is included, Al forms nitride and oxide to deteriorate the toughness of the weld metal, and thus, the upper limit of the amount of Al is 0.050%. In addition, in order to sufficiently obtain the effect for enhancing the toughness of the weld metal, the lower limit of the amount of Al may be 0.0015%. In order to sufficiently obtain the effect for enhancing the toughness of the weld metal, the lower limit of the amount of Al may be 0.002%, 0.003%, or 0.004%. In order to suppress formation of the coarse oxide, the upper limit of the amount of Al may be 0.045%, 0.040%, 0.035%, or 0.030%.

(Ni: 1.5 to 3.5%)

Ni is the only element which can enhance the toughness of the weld metal by solid solution toughening (operation of enhancing toughness by solid solution) regardless of structure and composition. In particular, Ni is an element effective for enhancing the toughness of the high-strength weld metal having 780 MPa or more of tensile strength. In order to obtain the necessary solid solution toughening effect, it is necessary that a lower limit of an amount of Ni is 1.5%.

The higher the amount of Ni is, the more favorable it is to enhance the toughness. On the other hand, if the amount is more than 3.5%, the weld cracking resistance is deteriorated, and thus, an upper limit of the amount of Ni is 3.5%. In order to stably ensure the effect of Ni to enhance the toughness, the lower limit of the amount of Ni may be 1.8%, 2.0%, 2.1%, or 2.2%. In addition, in order to secure the weld cracking resistance, the upper limit of the amount of Ni may be 3.3%, 3.1%, 2.9%, or 2.7%.

(Mo: 0.3 to 1.0%)

Mo is an element which enhances hardenability and which is effective for ensuring the tensile strength by forming fine carbide and precipitation strengthening. In addition, Mo has an effect for suppressing deterioration of strength which occur during reheating through subsequent passes in multilayer welding as well as an effect for suppressing deterioration of toughness. Since thick steel plates are used for large structure, welding is performed with the multilayer welding in this case. In the multilayer welding, the subsequent welding passes reheat a weld metal formed by prior passes, and thus, softening occurs in the weld metal formed by the prior passes. In 780 MPa-class high strength steel, the structure of the weld metal is mainly bainite, and thus, the softening is conspicuous. Therefore, it is difficult to stably secure the strength of the weld metal of 780 MPa-class high strength steel. Furthermore, the reheating deteriorates the toughness of the weld metal, since cementite is coarsened by the reheating. Mo forms fine carbides in the weld metal when the weld metal is reheated during the multilayer welding to suppress the deterioration of the strength of the weld metal, and has an effect for suppressing the coarsening of the cementite to suppress the deterioration of the toughness of the weld metal.

In order to exert the effects, in view of combined effect with other elements having similar effects, it is necessary that a lower limit of the amount of Mo is 0.3%. On the other hand, if more than 1.0% of Mo is included, the precipitates coarsen to deteriorate the toughness of the weld metal, and thus, an upper limit of the amount of Mo is 1.0%. In order to achieve both of further suppressing the deterioration of the strength by the reheating to stably secure the strength and suppressing the deterioration of the toughness, the lower limit of the amount of Mo may be 0.4%, 0.5%, or 0.6%. Moreover, in order to prevent the toughness of the weld metal from deterioration due to excessive amount of Mo, the upper limit of Mo may be 0.9% or 0.8%.

In addition to the above-mentioned basic compositions (essential elements), the flux-cored wire according to the present embodiment may include one or more of Cu, Cr, V, Ti, Nb, and B as alloy composition or metal deoxidizing composition and as optional element according to strength level of the steel sheet for welding or toughness level required. On the other hand, whether or not the optional element is included, as long as the amounts of the essential elements in the flux-cored wire are within the above-mentioned specified range, the flux-cored wire is assumed to be within the scope of the present invention.

(Cu: 0 to 0.5%)

Cu may be included in plating on the surface of the outer steel sheath of the flux-cored wire and the flux as a single element or an alloy and can enhance the strength and the toughness of the weld metal. Although a lower limit of the amount of Cu is 0%, the lower limit of the amount of Cu may be 0.1% to obtain the effects sufficiently. On the other hand, if the amount thereof is more than 0.5%, the toughness is deteriorated. Therefore, when Cu is included in the flux-cored wire, an upper limit of the amount of Cu is 0.5%. In order to reliably obtain the effect of including Cu and prevent the toughness from deterioration, the lower limit of the amount of Cu may be 0.15% or 0.2%. In order to enhance the toughness, the upper limit of the amount of Cu may be 0.4% or 0.3%.

The amount of Cu includes the amount thereof included in the outer steel sheath or the flux, as well as the amount thereof included in Cu plating if the Cu plating is formed on the surface of the flux-cored wire.

(Cr: 0 to 0.5%)

Cr is an element effective for high-strengthening of the weld metal, since Cr enhances hardenability of the weld metal. Although a lower limit of an amount of Cr is 0%, the lower limit of the amount of Cr may be 0.1% to obtain the effects. On the other hand, if more than 0.5% of Cr is included, Cr hardens the bainite structure of the weld metal unevenly to deteriorate the toughness. Therefore, when Cr is included, an upper limit of the amount of Cr is 0.5%. In order to further suppress the deterioration of the toughness due to Cr, the upper limit of Cr may be 0.4% or 0.3%.

(V: 0 to 0.04%)

V is an element effective for high-strengthening of the weld metal, since V enhances hardenability of the weld metal. Although a lower limit of an amount of V is 0%, the lower limit of the amount of V may be 0.01% to obtain the effects. On the other hand, if more than 0.04% of V is included, hardening of the weld metal and deterioration of the toughness occur due to precipitation of carbide. Therefore, when V is included, an upper limit of the amount of V is 0.04%. In order to surely obtain the effect of including V and to prevent the toughness from deterioration due to excessively amount of V, the upper limit of the amount of V may be 0.03% or 0.02%.

(Ti: 0 to 0.30%)

Ti is an element effective as deoxidizing element, similar to Al, and has an effect for reducing the amount of O in the weld metal. In addition, it is effective to fix solute N to reduce an adverse effect of N against the toughness. Although a lower limit of an amount of Ti is 0%, the lower limit of the amount of Ti may be 0.01% to obtain the effects. On the other hand, if the amount of Ti in the flux-cored wire is more than 0.30%, a deterioration of toughness due to forming of coarse oxide and a deterioration of toughness due to excessive precipitation strengthening may occur. Therefore, when Ti is included, an upper limit of the amount of Ti is 0.30%. In order to surely obtain the effect of including Ti, the lower limit of the amount of Ti may be 0.015% or 0.02%. Moreover, in order to further suppress the deterioration of the toughness due to Ti the upper limit of Ti may be 0.20%, 0.10%, or 0.05%.

(Nb: 0 to 0.10%)

Nb is an effective elements for securing tensile strength of the weld metal with precipitation strengthening, since Nb forms fine carbide in the weld metal. Although a lower limit of an amount of Nb is 0%, in order to obtain the effects, in view of combined effect with other elements having similar effects, the lower limit of the amount of Nb may be 0.01%. On the other hand, it is not preferable to include more than 0.10% of Nb, since Nb which included excessively in the weld metal forms coarse precipitate to deteriorate the toughness of the weld metal. Therefore, when Nb is included, an upper limit of the amount of Nb is 0.10%. In order to reliably obtain the effect of including Nb, the lower limit of the amount of Nb may be 0.015% or 0.02%. Moreover, in order to further suppress the deterioration of the toughness due to Nb, the upper limit of Nb may be 0.05%, 0.04%, or 0.03%.

(B: 0 to 0.0100%)

When a proper amount of B is included in the weld metal, B combines with solute N to form BN, and decrease an adverse effect of the solute N against the toughness. In addition, B has an effect of enhancing hardenability of the weld metal to contribute enhancing of the strength. Although a lower limit of the amount of B is 0%, the lower limit of B in the flux-cored wire may be 0.0001% or 0.0003% to obtain the effects. On the other hand, it is not preferable that the amount of B is more than 0.0100%, since the amount of B in the weld metal become excessive and a coarse compound of B such as BN and $Fe_{23}(C,B)_6$ and the like forms to deteriorate the toughness. Therefore, when B is included, an upper limit of the amount of B is 0.0100%. In order to surely obtain the effect of including B, the lower limit of the amount of B may be 0.0010%. Moreover, in order to further suppress the deterioration of the toughness due to B, the upper limit of B may be 0.0080%, 0.0060%, or 0.0040%.

In the present embodiment, in addition to the above-mentioned compositions, the flux-cored wire may further include one or both of Ca and REM as necessary within a range described below in order to adjust the ductility and the toughness of the weld metal.

(Ca: 0 to 0.50%)
(REM: 0 to 0.0100%)

Both of Ca and REM change a structure of sulfide and refine size of the sulfide and size of oxide in the weld metal to contribute enhancing of the ductility and the toughness of the weld metal. Although the lower limit of an amount of Ca and the lower limit of an amount REM are 0%, the lower limit of the amount of Ca may be 0.01% and the lower limit of the amount of REM may be 0.0002% in order to obtain the effect. On the other hand, if Ca and/or REM is excessively included, Ca and/or REM causes coarsening of the sulfide and the oxide to invite deterioration of the ductility and the toughness of the weld metal. In addition, degradation of weld bead shape and degradation of weldability may occur. Therefore, when they are included, the upper limit of Ca is 0.50% and the upper limit of REM is 0.0100%. In order to surely obtain the effect of including the elements, the lower limit of the amount of Ca may be 0.03% and the lower limit of the amount of REM may be 0.0003%.

In the flux-cored wire according to the present embodiment includes each elements as alloy composition or metal deoxidizing composition as described above. In addition, in order to secure the toughness of the weld metal, it is necessary that TE of the flux-cored wire which is defined by expression 1 described below and which is a total amount of ½ times of the amount of Mn, the amount of Ni, and 3 times of the amount of Cr (if Cr is not included, it is calculated with assuming Cr as 0%) is controlled to be 2.9 to 4.4%.

$$TE = \text{``Mn''}/2 + \text{``Ni''} + 3 \times \text{``Cr''} \quad \text{(Expression 1)}$$

The elements to which the double quote is attached represent the amounts thereof (in terms of mass %).

The structure of the weld metal of the 780 MPa-class high strength steel sheet is mainly bainite. In order to secure low-temperature toughness of the weld metal, it is necessary that intragranular transformation is caused with oxide in γ grain (austenite grain) being nucleation cite of bainite transformation to obtain fine bainite structure. Mn, Ni, and Cr exist in the weld metal mainly in a solid solution state, and the elements are necessary for obtaining hardenability optimal for the intragranular transformation to secure the toughness of the weld metal.

In order to obtain the effects of including the elements, it is necessary that a lower limit of (½)×"Mn"+"Ni"+3×"Cr", i.e. a lower limit of TE is 2.9%. If TE is lower than 2.9%, a coarse intergranular ferrite forms by decreasing the hardenability to deteriorate the toughness of the weld metal. On the other hand, if TE is higher than 4.4%, the intragranular transformation is not occur and the structure of the weld metal become mainly a coarse bainite structure or a coarse martensite structure, since the hardenability excessively increases, and thus the toughness of the weld metal deteriorates. The lower limit of TE may be 3.0%, 3.1%, or 3.2% and the upper limit of TE may be 4.2%, 4.0%, or 3.9%, which are ranges which can secure the strength and the toughness in the further right equilibrium.

Figure 2:
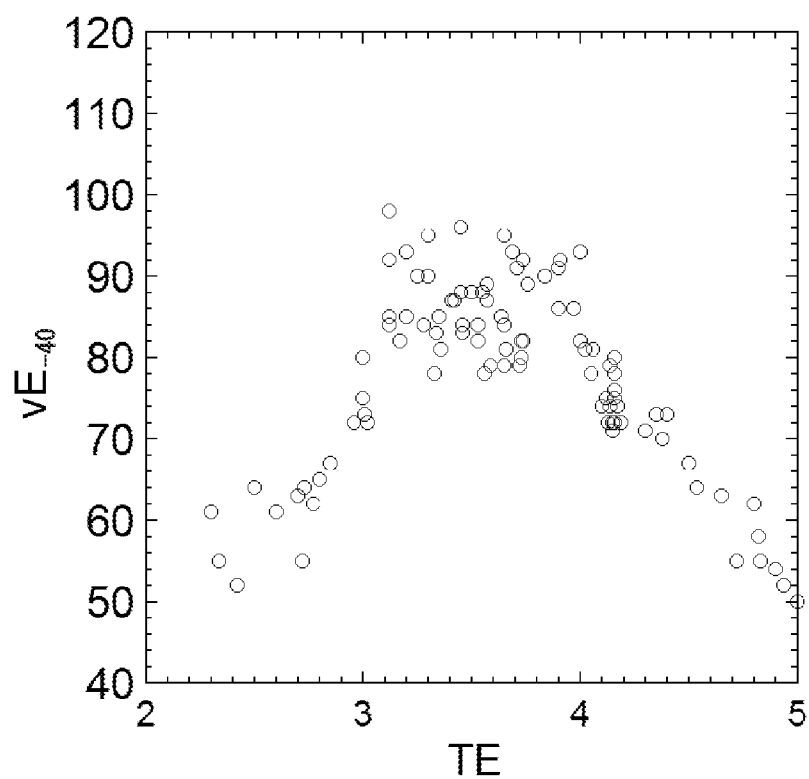
FIG. 2 A figure showing a relationship between TE and charpy absorbed energy at −40° C. vE−40.

FIG. 2 shows an experiment by which the above-mentioned findings were obtained. FIG. 2 is a graph showing a relationship between TE and a charpy absorbed energy at −40° C. When TE was less than 2.9% or more than 4.4%, the low-temperature toughness deteriorated. Therefore, it is necessary that TE is 2.9 to 4.4%.

In addition, in order to secure the tensile strength of the weld metal, it is necessary to further adjust the amounts of C, Si, Mn, Ni, Cr, Mo, and V so that carbon equivalent Ceq which is defined by expression 2 described below and which is defined by the Japan Welding Engineering Society (WES) is 0.50 to 0.75%.

$$Ceq = \text{``C''} + \text{``Si''}/24 + \text{``Mn''}/6 + \text{``Ni''}/40 + \text{``Cr''}/5 + \text{``Mo''}/4 + \text{``V''}/14 \quad \text{(Expression 2)}$$

The elements to which the double quote is attached represent the amounts thereof (in terms of mass %). An element which is not included is assumed as 0%.

When the Ceq value is high, since the weld metal hardens, the tensile strength increases but the toughness of the weld metal decreases and weld cracking susceptibility rises, and thus, a measure for suppressing cold cracking is needed. If the Ceq value is lower than 0.50%, 780 MPa or more of tensile strength, which is a target value for the weld metal, cannot be obtained. If the Ceq value is higher than 0.75%, the tensile strength of the weld metal become excess and the toughness of the weld metal deteriorates. Therefore, the range of the Ceq is 0.50 to 0.75%. In order to establish both tensile strength and toughness more effectively, the lower limit of the Ceq may be 0.57%, 0.59%, or 0.61% and the upper limit of the Ceq may be 0.73%, 0.71%, 0.69%, or 0.67%.

The amounts of the above-mentioned elements which are included as alloy compositions or metal deoxidizing compositions do not include the amounts the elements which are included as fluoride, metal oxide, or metal carbonate.

In addition, it is not necessary for these elements to be a pure substance (which may contain unavoidable impurities), and even when the elements are contained in an alloy type such as Cu—Ni, there is no problem. In addition, even when the elements are contained in an outer steel sheath or the elements are contained as a flux, the effect thereof is the same in each case. And thus, the elements may be included in either the outer steel sheath or the flux.

Next, a flux composition which is provided inside the outer steel sheath of the flux-cored wire will be described.

In the descriptions below, unless otherwise specified, "%" means "mass %" and amounts of each compositions mean the amounts of the each compositions in terms of mass % with respect to the total mass of the flux-cored wire including the outer steel sheath and the flux.

(Metal Fluoride Including $CaF_2$: 3.3 to 6.0%)

The flux-cored wire according to the present embodiment includes 3.3 to 6.0% of metal fluoride of which a major composition is $CaF_2$. In addition to $CaF_2$, one or more of $BaF_2$, $SrF_2$, $MgF_2$, and LiF may be included as the metal fluoride as necessary.

When the metal fluoride consisting of one or more of $CaF_2$, $BaF_2$, $SrF_2$, $MgF_2$, and LiF is included in the flux-cored wire as described above, an amount of the diffusible hydrogen in the weld metal becomes extremely small during welding the high strength steel having 780 MPa or more of tensile strength, and thus, cold crack resistance can be remarkably enhanced. Accordingly, welding in which preheating is omitted or simplified can be performed even during welding the high strength steel having 780 MPa or more of tensile strength. In addition, the metal fluoride is effective for reducing the amount of oxygen in the weld metal, and thus, the metal fluoride can also enhance the toughness of the weld metal.

In order to obtain the effects, it is necessary that the lower limit of a total amount of the metal fluoride is 3.3%. If the total amount of the metal fluoride is lower than 3.3%, the effects described above cannot be obtained sufficiently. The metal fluoride of which the total amount is higher than 6.0% is not preferable, since shield effect of the shielding gas is decreased by excessive generation of welding fume and weldability is remarkably deteriorated by the occurrence of air entrainment in the shielding gas and the occurrence of slag inclusion in the weld portion due to excessive generation of the slag. Therefore, when one or more of $CaF_2$, $BaF_2$, $SrF_2$, $MgF_2$, and LiF is included and the total amount thereof is defined as $\alpha$, $\alpha$ is 3.3 to 6.0% in terms of mass % with respect to the total mass of the flux-cored wire. In order to further enhance the toughness of the weld metal, the lower limit of the total amount of the metal fluoride may be 3.5% or 3.7%. In order to suppress deterioration of the weldability, the upper limit of the total amount of the metal fluoride may be 5.8%, 5.6%, or 5.4%.

In view of the effect for enhancing the toughness, any of $CaF_2$, $BaF_2$, $SrF_2$, $MgF_2$, and LiF can be used as the metal fluoride. On the other hand, in view of the weldability, it is preferable that $CaF_2$ is the main composition of the flux. In addition, when the weldability such as securing arc stability, suppression of sputter, and the like is prioritized, it is preferable that the lower limit of $CaF_2$ in terms of mass % with respect to the total amount ($\alpha$) of the metal fluoride ($CaF_2$, $BaF_2$, $SrF_2$, $MgF_2$, and/or LiF) is 90%. The lower limit of $CaF_2$ in terms of mass % with respect to a may be 95% or 100%, as needed.

In the technical field regarding to flux-cored wire, a detailed examination of the effect of the metal fluoride for decreasing diffusible hydrogen is unprecedented. In the present embodiment, an optimum embodiment for decreasing the diffusible hydrogen is found in view of the other flux composition, mechanical property of the weld metal, weldability, and the like. It is assumed that the reason why the metal fluoride decreases the diffusible hydrogen in the weld metal is that the metal fluoride is decomposed by welding arc, fluorine formed by the decomposition combines with the hydrogen to form HF gas, and the HF gas is scattered across the atmosphere or the hydrogen is fixed as HF in the weld metal.

(Metal Oxide: 0.4 to 1.2%)

The flux-cored wire according to the present embodiment includes one or more of Ti oxide, Si oxide, Mg oxide, Zr oxide, and Al oxide, for example, metal oxide such as $TiO_2$, $SiO_2$, $ZrO_2$, MgO, $Al_2O_3$, and the like as a slag forming agent. The metal oxide is included for keeping the weld bead shape in good condition. In order to obtain the adequate effect of the metal oxide, it is necessary that a lower limit of a total amount $\beta$ of the metal oxide is 0.4%. On the other hand, it is not preferable that the total amount $\beta$ of the metal oxide is higher than 1.2%, since the amount of oxygen in the weld metal increases to deteriorate the toughness.

The total amount of the metal oxide includes a total amount of $TiO_2$, $SiO_2$, $ZrO_2$, MgO, and $Al_2O_3$ as well as an amount of metal oxide included in binder used for pillarization of flux. In order to surely obtain the effects of the metal oxide, the lower limit of the total amount of the metal oxide may be 0.45%, 0.5%, 0.55%, or 0.6%. In addition, in order to suppress deterioration of the toughness of the weld metal due to including the metal oxide as low as possible, the upper limit of the total amount of the metal oxide may be 1.0%, 0.9%, or 0.8%.

As long as the amount $\beta$ is within the above-mentioned range, it is not necessary to define individual amounts of Ti oxide, Si oxide, Mg oxide, Zr oxide, and Al oxide, and lower limits thereof are 0%. On the other hand, in order to obtain good bead shape, $TiO_2$ of which an amount is within a range of 0.1 to 0.5% and $SiO_2$ of which an amount is within a range of 0.3 to 0.6% may be included.

In addition, arc stabilizer may be further included in the flux, as needed. The arc stabilizer is oxide or fluoride of Na or K (for example, $Na_2O$, NaF, $K_2O$, KF, $K_2SiF_6$, or $K_2ZrF_6$) and the like. The total amount thereof is preferably 0.001 to 0.40%. On the other hand, including the arc stabilizer is not essential, and therefore, a lower limit of the total amount of the oxide or the fluoride of Na or K is 0%. The oxide and the fluoride as the arc stabilizer illustrated herein is not included in the above-mentioned metal oxide as the slag forming agent and the above-mentioned metal fluoride for decreasing the diffusible hydrogen. If the oxide and the fluoride of Na and K is excess, the arc becomes strong and the sputter and the like increases, and thus, the amount thereof may be limited to 0.30% or less, 0.20% or less, less than 0.10%, or 0.80% or less, as necessary.

In order to obtain an effect for securing the low-temperature toughness of the weld metal, when the total amount of $CaF_2$, $BaF_2$, $SrF_2$, $MgF_2$, and LiF is defined as a and the total amount of the Ti oxide, the Si oxide, the Zr oxide, the Mg oxide, and the Al oxide is defined as $\beta$, it is preferable that $\alpha$ and $\beta$ satisfy the expression 3 described below. That is, it is preferable that a ratio of $\alpha$ with respect to $\beta$ is 3.1 to 15.0.

$$3.1 \leq \alpha/\beta \leq 15.0 \quad \text{(Expression 3)}$$

The reason is that the effect for decreasing oxygen due to the metal fluoride cannot be obtained sufficiently if $\alpha/\beta$ is lower than 3.1, and that the amount of oxide optimum for refining structure using intragranular transformation cannot be obtained due to extremely decreasing the oxygen if $\alpha/\beta$ is higher than 15.0.

(CaO: 0.15% or Less)

In the present embodiment, it is preferable that CaO is not included in the flux. However, raw material of the flux may include CaO. In this case, it is preferable that an upper limit of an amount of CaO is 0.15% in terms of mass % with respect to the total mass of the flux-cored wire. If the upper limit of the amount of CaO is 0.15%, the effect according to the present invention can be obtained. That is, it is preferable to select the raw material of the flux so that the upper limit of the amount of CaO is 0.15%. The upper limit of the amount of CaO may be 0.12%, 0.10%, or 0.08%, as needed.

The inventors obtained the finding described below by experiments. CaO is not preferable for composition included in the flux, since CaO change to CaOH which is a compound including the hydrogen by contact with atmosphere to increase the diffusible hydrogen in the weld metal. In addition, CaO has an effect for increasing basicity of molten pool to decrease the oxygen in the weld metal. In the present embodiment, the structure of the weld metal is refined by using the oxide as the nucleation site of the intragranular transformation to enhance the toughness of the weld metal, and thus, it is not preferable that the flux include CaO together with the metal fluoride to extremely reduce the amount of the oxygen in the weld metal to deteriorate the low-temperature toughness of the weld metal.

Figure 3:
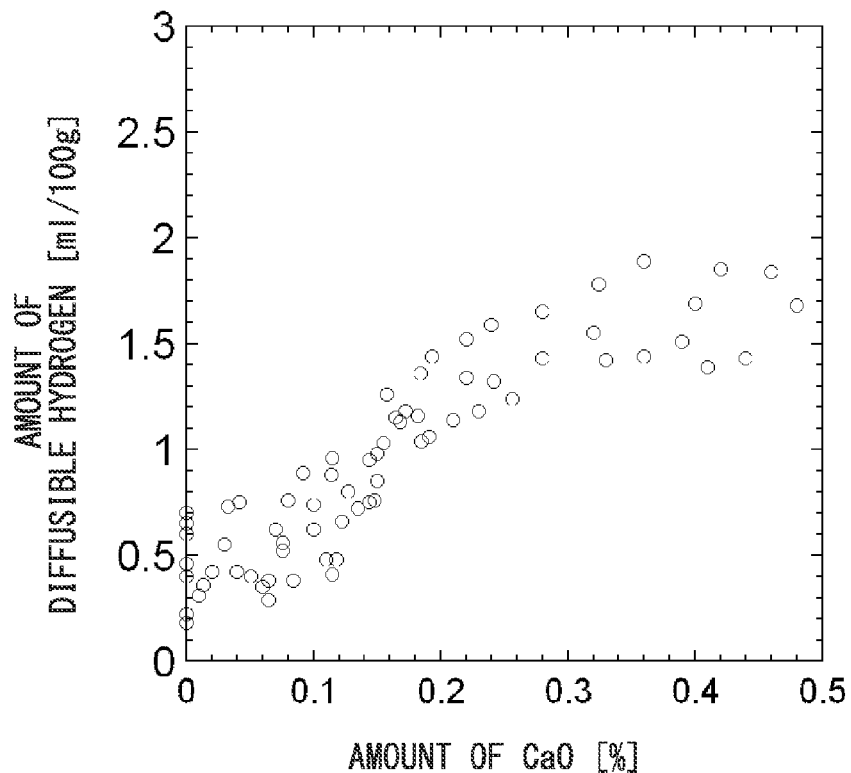
FIG. 3 A figure showing a relationship between an amount of CaO and an amount of diffusible hydrogen.
Figure 4:
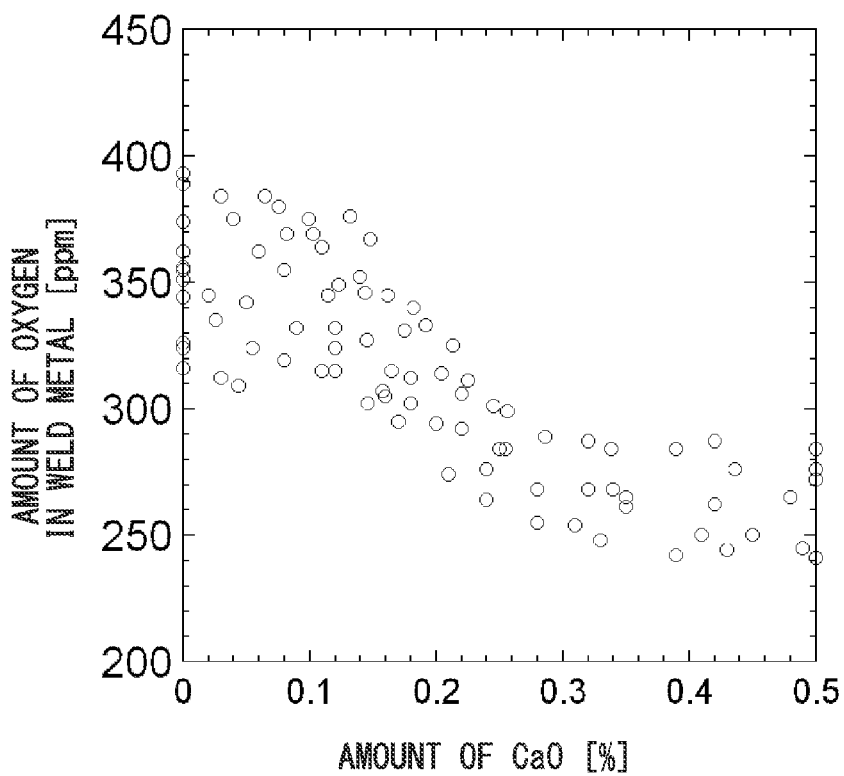
FIG. 4 A figure showing a relationship between the amount of CaO and an amount of oxygen in weld metal.

FIG. 3 and FIG. 4 show the experiment by which the above-mentioned findings were obtained. It became clear by the result shown in FIG. 3 that although as CaO increased the diffusible hydrogen in the weld metal increased, the amount of the diffusible hydrogen was 1.0 ml/100 g or less when the amount of CaO was less than 0.15%. It became clear by the result shown in FIG. 4 that as CaO increased the amount of the oxygen in the weld metal decreased. In the present embodiment, if the amount of the oxygen in the weld metal is extremely decreased, the low-temperature toughness of the weld metal is deteriorated. Therefore, in view of both of the amount of diffusible hydrogen and the amount of oxygen, it is preferable that the upper limit of the amount of CaO be 0.15%.

(Metal Carbonate: 0.1 to 0.5%)

It is necessary that the flux-cored wire according to the present embodiment includes 0.1 to 0.5% of metal carbonate which consists of one or more of $CaCO_3$, $BaCO_3$, $SrCO_3$, $MgCO_3$, and $Li_2CO_3$ in order to enhance arc stabilization operation and arc concentration. If a total amount of the metal carbonate is less than 0.1%, the effect described above cannot be obtained sufficiently, and thus, the arc become unstable and the bead shape degrades. On the other hand, if the total amount of the metal carbonate is more than 0.5%, the amount of the sputter become excess, since the arc concentration is excess. In order to further enhance the weldability, the upper limit of the total amount of the metal carbonate may be 0.45% or 0.4%. The lower limit of the total amount of the metal carbonate may be 0.15% or 0.2%, as necessary.

(Fe Powder: Less than 10%)

Fe powder may be included as necessary for adjusting filling rate of the flux in the flux-cored wire or for enhancing welding efficiency. However, since the surface layer of the Fe powder is oxidized, if the flux excessively includes the Fe powder, the amount of oxygen in the weld metal may increase to deteriorate the toughness. Therefore, it is not necessary to include the Fe powder. When the Fe powder is included for adjusting the filling rate, an upper limit of an amount of the Fe powder is less than 10% in order to secure the toughness of the weld metal.

The above is the reason for limiting the composition of the flux-cored wire according to the present embodiment. The remainder thereof is Fe and impurity. Fe includes Fe of the outer steel sheath, the iron powder included in the flux, and Fe in the alloy composition. In addition, the remainder which is mainly iron may include the impurity which may mix through manufacturing process and the like within a range which does not deteriorate the property of the present invention.

Next, a form of the flux-cored wire will be described.

The flux-cored wire including an outer steel sheath and a flux with which the outer steel sheath is filled is roughly classified in a seamless wire having a seamless shape in which the outer steel sheath does not have slit-shaped gap, or in a wire (wire having seam) which has the slit-shaped gap at joint of the outer steel sheath.

In the present embodiment, both constructions can be adopted. On the other hand, if there is a slit-shaped gap in the outer steel sheath of the flux-cored wire, the flux may absorb moisture during storage of the flux-cored wire due to intrusion of the moisture in atmosphere through the gap into the flux-cored wire. When welding is performed with using the flux-cored wire in the above-described state, the amount of the diffusible hydrogen in the flux-cored wire may increase, and thus, cold cracking of the weld metal may be caused. In order to suppress the cold cracking of the weld metal, it is preferable that the flux-cored wire is the seamless wire.

In addition, lubricant can be applied on the surface of the flux-cored wire in order to enhance feedability of the flux-cored wire during welding. Although various kinds of lubricants can be used as the lubricant for the flux-cored wire, it is preferable to use perfluoropolyether oil (PFPE oil) in order to suppress the cold cracking of the weld metal. The perfluoropolyether oil does not include hydrogen composition. Therefore, if the perfluoropolyether oil is applied to the flux-cored wire as lubricant, the perfluoropolyether oil does not increase the amount of the diffusible hydrogen in the weld metal.

The hydrogen entering into the weld portion during welding diffuses into the weld metal and the steel and aggregates especially at stress concentration part to cause the cold cracking. It is assumed that the source of the hydrogen is a moisture included in welding material, a moisture entering from atmosphere, rust and scale adhering on the surface of the steel, and the like. Under a welding condition in which cleanliness of the weld portion and the condition of gas shielding is sufficiently managed, the main source of the diffusible hydrogen in the weld joint is a hydrogen included in the flux-cored wire mainly as moisture.

Accordingly, it is preferable that the outer steel sheath is made to be a seamless pipe so that the hydrogen is prevented from entering from the atmosphere through the outer steel sheath into the flux during a period from manufacturing of the flux-cored wire to using of the flux-cored wire.

If the outer steel sheath is a pipe having the seam, moisture in atmosphere may enter through the seam of the outer steel sheath into the flux. Since the flux-cored wire, which has the seam and which is in its original form from the manufacturing, may not sufficiently prevent the hydrogen source such as moisture from entering, if the period from manufacturing of the flux-cored wire to using of the flux-cored wire is long, it is preferable that entire flux-cored wire is vacuum-packed or the flux-cored wire is stored in a container which can keep the flux-cored wire in dry state.

In the present embodiment, tensile strength of the weld metal or a deposited metal is equivalent to that of the high tensile strength steel having 780 MPa or more of tensile strength. The deposited metal is a metal which transits from filler metal (flux-cored wire) to the weld portion and the weld metal is a metal which melts and solidifies during welding (i.e. both of a fusion zone and the deposited metal, the fusion zone being a portion in which base metal melts among the weld portion). The tensile strength of the weld metal or the deposited metal can be measured by performing a tensile test on the weld metal or the deposited metal of the weld joint manufactured by using the flux-cored wire. Alternatively, it is known that there is a good correlation between hardness and the tensile strength. The tensile strength of the weld metal or the deposited metal may be obtained by measuring the hardness of the weld metal or the deposited metal of the weld joint and converting the hardness using the correlation. Moreover, if the flux-cored wire is available, the tensile strength of the deposited metal may be obtained by performing tensile test for deposited metal defined in JIS Z3111-2005, without manufacturing the weld joint using the high tensile strength steel. Although it is not necessary to define an upper limit of the tensile strength of the weld metal or the deposited metal, the upper limit of the tensile strength of the weld metal or the deposited metal may be defined as 940 MPa, 930 MPa, or 900 MPa. Furthermore, a charpy absorbed energy at −40° C. (average value of three pieces) of the weld metal or the deposited metal may be 69J or more, or a charpy absorbed energy at −40° C. per unit area of the weld metal or the deposited metal may be 86 J/cm² or more. When charpy impact test is performed with a subsize test piece, a charpy absorbed energy at −40° C. may be 86 J/cm² or more.

The flux-cored wire according to the present embodiment configured as described above may be manufactured through a manufacturing process of a conventional flux-cored wire.

That is, at first, a steel strip which will be the outer steel sheath and the flux in which the metal fluoride, the alloy composition, the metal oxide, the metal carbonate and the arc stabilizer are mixed so that the amounts thereof are within the predetermined range are prepared. Next, the steel strip is formed to be an open tube (U-shape) by a forming roll while the steel strip is fed to the longitudinal direction, and the open tube is made to be the outer steel sheath. The flux is fed during forming the steel strip through an opening of the open tube. After forming the steel strip, edge surfaces of the opening faced with each other is butted and seam-welded to obtain a seamless pipe. The seamless pipe is drawn, and the seamless pipe is annealed during drawing or after drawing. The seamless wire having a required diameter and including an outer steel sheath and a flux with which the outer steel sheath is filled is obtained by the above described processes. The flux-cored wire having a seam can be obtained by feeding the flux through the opening of the open tube, and then making it a pipe having the seam which is not seam-welded and drawing the pipe.

Next, a welding method using the flux-cored wire according to the present embodiment, a method for manufacturing the weld joint, and the weld joint will be described.

In a welding method using the flux-cored wire according to the present embodiment (welding method according to the present embodiment), the flux-cored wire according to the present embodiment and shielding gas are used to weld.

Although the shielding gas is not limited, the shielding gas is preferably one of 100 vol % Ar gas (pure Ar gas), 100 vol % carbon dioxide gas (pure carbon dioxide gas), and mixed gas of Ar and 3 to 30 vol % of $CO_2$. In addition, although type of the welding is not limited, gas shield arc welding is preferable.

In a method for manufacturing the weld joint using the flux-cored wire according to the present embodiment (method for manufacturing the weld joint according to the present embodiment), a steel sheet is welded using the flux-cored wire according to the present embodiment and the shielding gas described above. Although the steel sheet is not limited, the method can be applied to mainly a steel having 780 MPa or more of tensile strength. Welding a steel having a tensile strength which is higher than that of the weld metal is not prevented, and thus, it is not necessary to define the upper limit of the tensile strength of the steel. On the other hand, the upper limit of the tensile strength of the steel may be defined as 1100 MPa, 1050 MPa, 1000 MPa, 940 MPa, or 900 MPa. Although it is not necessary to define the thickness of the steel, a steel having a thickness of 3 to 100 mm is conventional, and thus, the thickness of the steel may be defined as the thickness of 3 to 100 mm.

In a weld joint manufactured by the method for manufacturing the weld joint according to the present embodiment (weld joint according to the present embodiment) includes a steel having a tensile strength of 780 MPa or more and having a thickness of 3 to 100 mm (including heat affected zone of the steel) and a weld metal. In the weld joint according to the present embodiment, an amount of the diffusible hydrogen in the weld metal may be less than 1.0 ml/100 g, an amount of oxygen in the weld metal may be 300 to 400 ppm, tensile strength of the weld metal may be 780 to 940 MPa, and a charpy absorbed energy at −40° C. of the weld metal may be 69 J or more.

The amount of the diffusible hydrogen in the weld metal of the weld joint manufactured by using the flux-cored wire according to the present embodiment is less than 1.0 ml/100 g. In addition, the amount of the oxygen in the weld metal of the weld joint manufactured by using the flux-cored wire according to the present embodiment is 300 to 400 ppm. The amount of the oxygen in the weld metal can be measured by known method. For example, a measuring method by an inert gas fusion-infrared absorption method is illustrated as the measuring method for the amount of the oxygen in the weld metal. The toughness and the cold crack resistance of the weld portion can be enhanced by limiting the amount of the diffusible hydrogen in the weld metal to be less than 1.0 ml/100 g and the amount of the oxygen in the weld metal of the weld joint to be 300 to 400 ppm. The weld joint manufactured by using the flux-cored wire according to the present embodiment has a weld metal of which tensile strength is 780 to 940 MPa and of which charpy absorbed energy at −40° C. is 69 J or more.

The weld joint according to the present embodiment is excellent in strength and low-temperature toughness even though the base material thereof is a high strength steel having high weld cracking susceptibility.

EXAMPLE

Next, operability and effect of the present invention will be described in detail with examples.

A steel strip was formed to be an open tube by a forming roll while the steel strip was fed in the longitudinal direction, the flux was fed during the forming through an opening of the open tube, and then edge surfaces of the opening faced with each other was butted and seam-welded to obtain a seamless pipe. The flux-cored wire obtained by tubulization described above was drawn, and the flux-cored wire was annealed during drawing to manufacture a trial flux-cored wire having a diameter of φ1.2 mm. After the manufacturing, a lubricant was applied on a surface of the trial flux-cored wire. In addition, a trial flux-cored wire having a seam and having a diameter of φ1.2 mm was manufactured by drawing a pipe which had the seam and was not seam-welded. Moreover, a trial solid wire (a weld wire which is not hollow and of which the cross section is uniformly) in which alloy composition was within the range of the present invention but flux was not included was manufactured.

Analyze of the chemical composition of the manufactured trial flux-cored wire was performed as described below. First, the flux filled in the flux-cored wire was drawn from the flux-cored wire to separate the flux-cored wire into outer steel sheath and the flux. The chemical composition of the outer steel sheath was obtained by measuring each amounts of metal compositions with chemical analysis. Regarding the flux, at first, a quantitative evaluation for constituent and composition thereof was performed with X-ray diffraction analysis and fluorescent X-ray analysis. Next, the flux was separated into slag constituent and alloy constituent with concentration method such as flotation, magnetic concentration, and the like and the chemical compositions thereof was analysed with chemical analysis, gas analysis, and the like.

The compositions of the manufactured trial flux-cored wire are shown in Table 1-1 to Table 1-6 and Table 2-1 to Table 2-6. The chemical composition shown in Table 2-1 to Table 2-6 did not include the chemical composition of fluoride, metal oxide, and metal carbonate. Among examples and comparative examples shown in the Tables, A78 and A85 were the flux-cored wire having the seam, and B39 and B40 were the solid wire (SW). All other examples and comparative examples were the flux-cored wire having seamless shape. In addition, among examples and comparative examples shown in the Tables, PFPE oil was applied to the surface of A03, A12, A19, A36, A39, A40, A42, A61, and B18. The PFPE oil was not applied to other examples and comparative examples. A symbol "-" in the Tables means that the element thereof was not included by design.

Base materials having a plate thickness of 20 mm were butted to each other with a root gap of 16 mm and a groove angle of 20°, and then welding was performed by using the flux-cored wire described above and a backing metal under welding conditions shown in Table 3. SM490A defined in JIS G3106-2008 was used as the base material and the backing metal. In addition, buttering which had two or more layers and in which the height of weld reinforcement was 3 mm or more was performed with respect to the groove face of the base metal and the surface of the backing metal with the tested flux-cored wire.

[Table 1-1]
[Table 1-2]
[Table 1-3]
[Table 1-4]
[Table 1-5]
[Table 1-6]
[Table 2-1]
[Table 2-2]
[Table 2-3]
[Table 2-4]
[Table 2-5]
[Table 2-6]
[Table 3]

Tensile strength and charpy absorbed energy of deposited metals were measured by correcting a No. A1 tensile test specimen (round bar) (diameter=12.5 mm) 5 in accordance with JIS Z 3111-2005 (METHODS OF TENSION AND IMPACT TESTS FOR DEPOSITED METAL) and a Charpy test specimen (V-notch test specimen) 4 from the obtained weld metal 3 as shown in FIG. 1, and performing mechanical characteristic test. The buttering was performed on the surface of the groove part and the backing metal Evaluation criteria of the mechanical characteristics were as follows. When the mechanical characteristics of the deposited metal satisfies the acceptability criterion, the weld metal can be judged that the characteristics of the weld metal is substantially equal to the deposited metal.

Tensile strength: Test piece having 780 MPa of tensile strength at room temperature was acceptable.

Toughness: Test piece having 69 J or more of absorbed energy (average value of three pieces) in charpy impact test at −40° C. was acceptable.

Evaluation results of obtained mechanical characteristics are shown in Table 4-1 to Table 4-6.

In addition, a test specimen was collected from the obtained deposited metal to measure the amount of oxygen in the deposited metal.

The amount of the oxygen in the deposited metal was measured by an inert gas fusion-infrared absorption method. The amounts of oxygen which were measured are shown in Table 4-1 to Table 4-6.

Regarding evaluation of the amount of the oxygen, 300 to 400 ppm of the amount of oxygen, which is an optimal amount of the oxygen to obtain an effect for enhancing toughness due to low-oxygenation by fluoride and to obtain an effect for enhancing low-temperature toughness due to refining structure by using intragranular transformation, was accepted. When the amount of the oxygen of the deposited metal satisfies the acceptability criterion, the weld metal can be judged that the amount of the oxygen of the weld metal is substantially satisfies the acceptability criterion.

Measurement of the amount of the diffusible hydrogen was performed to the test specimen which was welded under a weld condition same to that of the mechanical characteristic test by gas chromatograph method (diffusible hydrogen test) according to JIS Z3118-2007 (METHOD FOR MEASUREMENT OF AMOUNT OF HYDROGEN EVOLVED FROM STEEL WELDS).

Results are shown in Table 4-1 to Table 4-6. Evaluation criterion of the amount of the diffusible hydrogen was as follows.

Amount of diffusible hydrogen: Less than 1.0 ml/100 g (Extremely low hydrogen level) was acceptable.

Cold crack resistance was evaluated by testing under a method according to JIS 23157-1993 (METHOD OF U-GROOVE WELD CRACKING TEST). That is, at first, U-groove weld cracking test specimens were manufactured by providing edge preparation to steel sheets, which are a high tensile strength steel sheet WEL-TEN780 (registered trade-mark) (made by Nippon Steel and Sumitomo Metal cooperation) for welding construction and which have 25 mm of thickness, so as to be U-groove having 1 mm of root opening. Next, test pieces were obtained by performing test welding under the welding conditions shown in Table 3 at a welding yard managed under a constant atmosphere in which temperature was 0° C. and humidity was 60%. The cross sections of the welded test pieces were observed to measure cracking ratio and the cold crack resistance of the flux-cored wires were evaluated based on the measuring results. Evaluation of the cold crack resistance was as follows.

Cold crack resistance: A test piece in which cross section cracking did not occur at weld portion in the U-groove weld cracking test (a test piece of which cross section cracking ratio was 0) was acceptable.

Results of U-groove weld cracking test which were obtained are shown in Table 4-1 to Table 4-6. Even when the test welding was performed under 0° C., which is a very low temperature, without preheating, all of the cross sections of the test pieces which were manufactured by the U-groove weld cracking test and of which the amount of the diffusible hydrogen were less than 1.0 ml/100 g did not have cross section cracking (i.e. cross section cracking did not occur therein), and therefore, very high cold crack resistance was verified.

As shown in the test results of Table 4-1 to Table 4-6, all of tensile strength, toughness, amount of oxygen in deposited metal, amount of diffusible hydrogen, and cold crack resistance of flux-cored wire No. A01 to A85, which were inventive examples, were excellent and acceptable.

On the other hand, flux-cored wires No. B01 to B44, which were comparative examples, did not satisfy requirement defined in the present invention, and thus, cold crack resistance, charpy absorbed energy at −40° C., and the like thereof did not satisfy the admission criteria and were not acceptable.

[Table 4-1]
[Table 4-2]
[Table 4-3]
[Table 4-4]
[Table 4-5]
[Table 4-6]

INDUSTRIAL APPLICABILITY

In welding steel having 780 MPa or more of high strength, the flux-cored wire according to the present invention can omit or remarkably reduce preheating for suppressing cold cracking to extremely enhance the efficiency of the welding procedure, and thus, the value thereof in the industry is extremely high.

REFERENCE SIGNS LIST

1 Steel sheet
2 Backing metal
3 Weld bead
4 Charpy test specimen (V-notch test specimen)
5 No. A1 tensile test specimen (round bar) (diameter=12.5 mm)

FIGURES

[FIG. 1]
[FIG. 2]
[FIG. 3]
[FIG. 4]

TABLE 1-1

| | | AN AMOUNT OF FLOURIDE, METAL OXIDE, METAL CARBONATE, AND Fe POWDER (MASS % WITH RESPECT TO THE TOTAL MASS OF FLUX-CORED WIRE) | | | | | | | | | | | | |
|---|---|---|---|---|---|---|---|---|---|---|---|---|---|---|
| | WIRE | METAL FLUORIDE | | | | | | METAL OXIDE | | | | | | Fe |
| CATEGORY | NO. | $CaF_2$ | $BaF_2$ | $SrF_2$ | $MgF_2$ | LiF | TOTAL | $TiO_2$ | $SiO_2$ | $ZrO_2$ | $Al_2O_3$ | MgO | TOTAL | $CaCO_3$ | POWDER |
| EXAMPLE | A01 | 4.7 | — | — | — | — | 4.7 | 0.37 | 0.53 | — | 0.11 | — | 1.01 | 0.26 | — |
| | A02 | 5.5 | — | — | — | — | 5.5 | 0.38 | 0.39 | — | — | — | 0.77 | 0.40 | — |
| | A03 | 5.4 | 0.2 | 0.2 | 0.1 | — | 5.9 | 0.44 | 0.51 | — | — | — | 0.95 | 0.37 | — |
| | A04 | 3.8 | — | — | — | — | 3.8 | 0.13 | 0.54 | — | — | — | 0.67 | 0.11 | — |
| | A05 | 3.8 | — | 0.2 | — | — | 4.0 | 0.37 | — | — | — | 0.32 | 0.69 | 0.14 | — |
| | A06 | 4.2 | — | — | — | — | 4.2 | 0.25 | 0.53 | — | — | — | 0.78 | 0.10 | — |
| | A07 | 4.7 | — | — | — | — | 4.7 | 0.26 | 0.37 | — | — | — | 0.63 | 0.16 | — |
| | A08 | 4.8 | — | — | — | — | 4.8 | 0.33 | 0.56 | 0.22 | — | — | 1.11 | 0.47 | — |
| | A09 | 4.2 | — | — | — | — | 4.2 | 0.13 | 0.34 | — | — | — | 0.47 | 0.28 | — |
| | A10 | 5.5 | — | — | — | — | 5.5 | 0.38 | 0.45 | — | — | — | 0.83 | 0.10 | — |
| | A11 | 3.6 | — | — | — | — | 3.6 | — | 0.55 | — | — | — | 0.55 | 0.13 | 7.8 |
| | A12 | 4.9 | — | — | 0.3 | — | 5.2 | 0.29 | 0.47 | — | — | 0.26 | 1.02 | 0.50 | — |
| | A13 | 4.6 | — | — | — | — | 4.6 | 0.28 | 0.52 | — | — | — | 0.80 | 0.44 | — |
| | A14 | 4.5 | 0.4 | 0.1 | — | — | 5.0 | 0.44 | 0.41 | — | — | — | 0.85 | 0.40 | — |
| | A15 | 3.6 | — | — | — | — | 3.6 | 0.38 | 0.39 | — | 0.28 | 0.11 | 1.16 | 0.32 | — |
| | A16 | 5.3 | — | — | — | — | 5.3 | 0.22 | 0.56 | — | 0.24 | — | 1.02 | 0.17 | — |
| | A17 | 4.6 | — | — | — | — | 4.6 | 0.10 | 0.39 | — | — | — | 0.49 | 0.46 | — |
| | A18 | 4.1 | — | — | — | — | 4.1 | 0.22 | 0.37 | — | — | — | 0.59 | 0.10 | 2.9 |
| | A19 | 6.0 | — | — | — | — | 6.0 | 0.23 | 0.36 | — | — | — | 0.59 | 0.30 | — |
| | A20 | 4.1 | — | — | — | — | 4.1 | 0.46 | 0.54 | — | — | — | 1.00 | 0.21 | — |
| | A21 | 5.7 | — | — | — | — | 5.7 | 0.25 | 0.56 | — | — | — | 0.81 | 0.19 | — |
| | A22 | 5.4 | — | — | — | — | 5.4 | 0.37 | 0.42 | — | — | — | 0.79 | 0.14 | — |
| | A23 | 3.6 | — | — | — | — | 3.6 | 0.26 | 0.58 | — | — | — | 0.84 | 0.49 | — |
| | A24 | 5.1 | 0.4 | — | — | — | 5.5 | 0.21 | 0.30 | — | — | — | 0.51 | 0.22 | — |
| | A25 | 4.9 | — | — | — | — | 4.9 | 0.38 | 0.32 | — | — | — | 0.70 | 0.30 | — |
| | A26 | 4.4 | — | — | — | — | 4.4 | 0.36 | 0.33 | — | — | — | 0.69 | 0.18 | 4.6 |
| | A27 | 4.0 | — | — | — | — | 4.0 | — | 0.51 | — | — | — | 0.51 | 0.12 | 8.7 |
| | A28 | 5.6 | — | — | — | — | 5.6 | 0.14 | 0.58 | — | — | 0.10 | 0.82 | 0.41 | 8.6 |
| | A29 | 4.4 | — | — | — | — | 4.4 | 0.25 | 0.43 | — | — | — | 0.68 | 0.39 | — |
| | A30 | 4.7 | 0.2 | 0.1 | 0.1 | — | 5.1 | 0.45 | 0.37 | — | — | — | 0.82 | 0.18 | — |
| | A31 | 4.9 | — | — | — | — | 4.9 | 0.16 | 0.40 | 0.13 | 0.15 | — | 0.84 | 0.38 | — |
| | A32 | 3.6 | — | — | 0.1 | — | 3.7 | 0.33 | 0.41 | — | — | — | 0.74 | 0.35 | — |

| CATEGORY | WIRE NO. | MASS RATIO OF $CaF_2$ WITH RESPECT TO TOTAL AMOUNT OF METAL FLUORIDE (%) | AMOUNT OF CaO (MASS %) | REMARKS | TOTAL AMOUNT [α]/ TOTAL AMOUNT [β] |
|---|---|---|---|---|---|
| EXAMPLE | A01 | 100 | 0.00 | | 4.7 |
| | A02 | 100 | 0.12 | | 7.1 |
| | A03 | 92 | 0.02 | APPLYING PFPE OIL | 6.2 |
| | A04 | 100 | 0.05 | | 5.7 |
| | A05 | 95 | 0.06 | | 5.8 |
| | A06 | 100 | 0.00 | | 5.4 |
| | A07 | 100 | 0.06 | | 7.5 |
| | A08 | 100 | 0.00 | | 4.3 |
| | A09 | 100 | 0.04 | | 8.9 |
| | A10 | 100 | 0.06 | | 6.6 |
| | A11 | 100 | 0.07 | | 6.5 |
| | A12 | 94 | 0.00 | APPLYING PFPE OIL | 5.1 |
| | A13 | 100 | 0.03 | | 5.8 |
| | A14 | 90 | 0.04 | | 5.9 |
| | A15 | 100 | 0.00 | | 3.1 |
| | A16 | 100 | 0.13 | | 5.2 |
| | A17 | 100 | 0.00 | | 9.4 |
| | A18 | 100 | 0.04 | | 6.9 |
| | A19 | 100 | 0.00 | APPLYING PFPE OIL | 10.2 |

TABLE 1-1-continued

| | | | |
|---|---|---|---|
| A20 | 100 | 0.06 | 4.1 |
| A21 | 100 | 0.06 | 7.0 |
| A22 | 100 | 0.03 | 6.8 |
| A23 | 100 | 0.10 | 4.3 |
| A24 | 93 | 0.02 | 10.8 |
| A25 | 100 | 0.00 | 7.0 |
| A26 | 100 | 0.14 | 6.4 |
| A27 | 100 | 0.02 | 7.8 |
| A28 | 100 | 0.11 | 6.8 |
| A29 | 100 | 0.03 | 6.5 |
| A30 | 92 | 0.04 | 6.2 |
| A31 | 100 | 0.13 | 5.8 |
| A32 | 97 | 0.09 | 5.0 |

TABLE 1-2

AN AMOUNT OF FLOURIDE, METAL OXIDE, METAL CARBONATE, AND Fe POWDER
(MASS % WITH RESPECT TO THE TOTAL MASS OF FLUX-CORED WIRE)

| CATEGORY | WIRE NO. | METAL FLUORIDE | | | | | | METAL OXIDE | | | | | | CaCO$_3$ | Fe POWDER |
|---|---|---|---|---|---|---|---|---|---|---|---|---|---|---|---|
| | | CaF$_2$ | BaF$_2$ | SrF$_2$ | MgF$_2$ | LiF | TOTAL | TiO$_2$ | SiO$_2$ | ZrO$_2$ | Al$_2$O$_3$ | MgO | TOTAL | | |
| EXAMPLE | A33 | 3.6 | — | — | 0.4 | — | 4.0 | 0.10 | 0.51 | — | — | — | 0.61 | 0.40 | — |
| | A34 | 4.7 | — | — | — | — | 4.7 | 0.40 | 0.49 | 0.31 | — | — | 1.20 | 0.29 | — |
| | A35 | 4.6 | — | — | — | — | 4.6 | 0.45 | 0.49 | — | — | — | 0.94 | 0.39 | — |
| | A36 | 5.5 | — | — | — | — | 5.5 | 0.45 | — | — | — | — | 0.45 | 0.50 | 2.9 |
| | A37 | 3.8 | — | — | 0.4 | — | 4.2 | 0.50 | 0.42 | — | — | — | 0.92 | 0.41 | — |
| | A38 | 4.9 | — | — | — | — | 4.9 | 0.19 | 0.45 | — | — | — | 0.64 | 0.37 | — |
| | A39 | 5.1 | — | — | — | — | 5.1 | 0.46 | 0.55 | — | — | — | 1.01 | 0.38 | — |
| | A40 | 5.0 | — | — | — | — | 5.0 | — | 0.52 | — | — | — | 0.52 | 0.48 | 3.0 |
| | A41 | 3.3 | — | — | — | — | 3.3 | 0.33 | 0.48 | — | — | — | 0.81 | 0.50 | — |
| | A42 | 5.7 | — | — | — | — | 5.7 | 0.28 | 0.55 | — | — | — | 0.83 | 0.16 | — |
| | A43 | 5.2 | — | — | — | — | 5.2 | 0.40 | 0.56 | — | — | — | 0.96 | 0.14 | — |
| | A44 | 3.9 | — | — | — | — | 3.9 | 0.42 | 0.60 | — | — | — | 1.02 | 0.32 | — |
| | A45 | 4.8 | — | — | — | — | 4.8 | 0.39 | 0.49 | — | — | — | 0.88 | 0.19 | — |
| | A46 | 5.1 | — | — | — | — | 5.1 | 0.31 | 0.45 | — | — | — | 0.76 | 0.22 | 7.3 |
| | A47 | 3.6 | — | — | — | — | 3.6 | 0.11 | 0.44 | — | — | — | 0.55 | 0.46 | 0.5 |
| | A48 | 5.2 | — | — | — | — | 5.2 | 0.25 | 0.35 | — | — | — | 0.60 | 0.23 | — |
| | A49 | 5.0 | — | — | — | — | 5.0 | 0.47 | — | — | — | — | 0.47 | 0.14 | — |
| | A50 | 3.8 | — | — | — | — | 3.8 | 0.28 | 0.57 | — | — | — | 0.85 | 0.37 | — |
| | A51 | 5.4 | — | 0.2 | 0.3 | — | 5.9 | 0.28 | 0.41 | — | — | — | 0.69 | 0.50 | — |
| | A52 | 4.9 | 0.5 | — | — | — | 5.4 | 0.10 | 0.30 | — | — | — | 0.40 | 0.45 | — |
| | A53 | 4.5 | — | — | — | — | 4.5 | 0.50 | 0.65 | — | — | — | 1.15 | 0.36 | — |
| | A54 | 4.6 | — | 0.2 | — | — | 4.8 | — | 0.33 | — | 0.21 | — | 0.54 | 0.32 | — |
| | A55 | 5.4 | — | — | — | — | 5.4 | 0.47 | 0.60 | — | — | — | 1.07 | 0.49 | — |
| | A56 | 5.5 | — | — | — | — | 5.5 | 0.16 | 0.44 | — | — | — | 0.60 | 0.17 | — |
| | A57 | 4.3 | — | — | — | — | 4.3 | 0.44 | 0.46 | — | — | — | 0.90 | 0.10 | 9.8 |
| | A58 | 4.4 | 0.3 | — | — | — | 4.7 | 0.36 | 0.59 | — | — | — | 0.95 | 0.38 | 1.2 |
| | A59 | 5.0 | — | 0.2 | 0.3 | — | 5.5 | 0.44 | 0.59 | — | — | — | 1.03 | 0.39 | 7.9 |
| | A60 | 5.3 | — | — | 0.4 | — | 5.7 | 0.43 | 0.47 | — | — | — | 0.90 | 0.33 | 8.9 |
| | A61 | 5.0 | 0.3 | — | 0.1 | — | 5.4 | 0.15 | 0.31 | — | — | — | 0.46 | 0.16 | 6.2 |
| | A62 | 4.9 | — | 0.5 | — | — | 5.4 | 0.26 | 0.32 | — | — | 0.33 | 0.91 | 0.25 | — |

| CATEGORY | WIRE NO. | MASS RATIO OF CaF$_2$ WITH RESPECT TO TOTAL AMOUNT OF METAL FLUORIDE (%) | AMOUNT OF CaO (MASS %) | REMARKS | TOTAL AMOUNT [α]/ TOTAL AMOUNT [β] |
|---|---|---|---|---|---|
| EXAMPLE | A33 | 90 | 0.00 | | 6.6 |
| | A34 | 100 | 0.15 | | 3.9 |
| | A35 | 100 | 0.09 | | 4.9 |
| | A36 | 100 | 0.00 | APPLYING PFPE OIL | 12.2 |
| | A37 | 90 | 0.03 | | 4.6 |
| | A38 | 100 | 0.04 | | 7.7 |
| | A39 | 100 | 0.02 | APPLYING PFPE OIL | 5.0 |
| | A40 | 100 | 0.03 | APPLYING PFPE OIL | 9.6 |
| | A41 | 100 | 0.11 | | 4.1 |
| | A42 | 100 | 0.00 | APPLYING PFPE OIL | 6.9 |
| | A43 | 100 | 0.03 | | 5.4 |
| | A44 | 100 | 0.02 | | 3.8 |
| | A45 | 100 | 0.05 | | 5.5 |
| | A46 | 100 | 0.00 | | 6.7 |

TABLE 1-2-continued

| | | | | |
|---|---|---|---|---|
| A47 | 100 | 0.06 | | 6.5 |
| A48 | 100 | 0.03 | | 8.7 |
| A49 | 100 | 0.05 | | 10.6 |
| A50 | 100 | 0.00 | | 4.5 |
| A51 | 92 | 0.14 | | 8.6 |
| A52 | 91 | 0.03 | | 13.5 |
| A53 | 100 | 0.06 | | 3.9 |
| A54 | 96 | 0.00 | | 8.9 |
| A55 | 100 | 0.01 | | 5.0 |
| A56 | 100 | 0.09 | | 9.2 |
| A57 | 100 | 0.00 | | 4.8 |
| A58 | 94 | 0.02 | | 4.9 |
| A59 | 91 | 0.08 | | 5.3 |
| A60 | 93 | 0.09 | | 6.3 |
| A61 | 93 | 0.02 | APPLYING PFPE OIL | 11.7 |
| A62 | 91 | 0.03 | | 5.9 |

TABLE 1-3

AN AMOUNT OF FLOURIDE, METAL OXIDE, METAL CARBONATE, AND Fe POWDER
(MASS % WITH RESPECT TO THE TOTAL MASS OF FLUX-CORED WIRE)

| CATEGORY | WIRE NO. | METAL FLUORIDE | | | | | | METAL OXIDE | | | | | | CaCO$_3$ | Fe POWDER |
|---|---|---|---|---|---|---|---|---|---|---|---|---|---|---|---|
| | | CaF$_2$ | BaF$_2$ | SrF$_2$ | MgF$_2$ | LiF | TOTAL | TiO$_2$ | SiO$_2$ | ZrO$_2$ | Al$_2$O$_3$ | MgO | TOTAL | | |
| EXAMPLE | A63 | 3.8 | — | — | — | — | 3.8 | 0.15 | 0.46 | — | — | — | 0.61 | 0.24 | — |
| | A64 | 4.6 | — | — | — | — | 4.6 | 0.24 | 0.34 | — | 0.15 | — | 0.73 | 0.15 | — |
| | A65 | 4.1 | — | — | — | — | 4.1 | 0.35 | 0.53 | — | — | — | 0.88 | 0.18 | — |
| | A66 | 5.3 | — | — | — | — | 5.3 | 0.26 | 0.31 | — | — | — | 0.57 | 0.30 | — |
| | A67 | 4.0 | — | — | — | — | 4.0 | 0.18 | 0.35 | — | — | 0.25 | 0.78 | 0.16 | — |
| | A68 | 3.8 | 0.2 | — | 0.2 | — | 4.2 | 0.12 | 0.43 | — | — | — | 0.55 | 0.48 | — |
| | A69 | 4.5 | — | 0.3 | — | — | 4.8 | 0.28 | 0.38 | 0.28 | — | — | 0.94 | 0.15 | — |
| | A70 | 5.3 | — | — | 0.1 | — | 5.4 | 0.45 | 0.32 | — | — | — | 0.77 | 0.10 | — |
| | A71 | 3.5 | 0.2 | — | — | — | 3.7 | 0.33 | 0.42 | — | — | — | 0.75 | 0.22 | — |
| | A72 | 4.0 | — | — | — | — | 4.0 | 0.21 | 0.30 | — | — | 0.20 | 0.71 | 0.12 | — |
| | A73 | 4.5 | — | — | — | — | 4.5 | 0.16 | 0.46 | 0.12 | — | — | 0.74 | 0.20 | — |
| | A74 | 4.8 | — | 0.1 | — | — | 4.9 | 0.28 | 0.42 | — | 0.26 | — | 0.96 | 0.15 | — |
| | A75 | 4.2 | — | — | — | — | 4.2 | 0.15 | 0.56 | — | — | — | 0.71 | 0.12 | — |
| | A76 | 4.5 | — | — | — | — | 4.5 | 0.48 | 0.55 | — | — | — | 1.03 | 0.25 | 2.2 |
| | A77 | 4.1 | — | — | — | — | 4.1 | 0.38 | 0.40 | — | — | — | 0.78 | 0.16 | — |

| CATEGORY | WIRE NO. | MASS RATIO OF CaF$_2$ WITH RESPECT TO TOTAL AMOUNT OF METAL FLUORIDE (%) | AMOUNT OF CaO (MASS %) | REMARKS | TOTAL AMOUNT [α]/ TOTAL AMOUNT [β] |
|---|---|---|---|---|---|
| EXAMPLE | A63 | 100 | 0.04 | | 6.2 |
| | A64 | 100 | 0.03 | | 6.3 |
| | A65 | 100 | 0.15 | | 4.7 |
| | A66 | 100 | 0.00 | | 9.3 |
| | A67 | 100 | 0.15 | | 5.1 |
| | A68 | 90 | 0.00 | | 7.6 |
| | A69 | 94 | 0.02 | | 5.1 |
| | A70 | 98 | 0.07 | | 7.0 |
| | A71 | 95 | 0.00 | | 4.9 |
| | A72 | 100 | 0.05 | | 5.6 |
| | A73 | 100 | 0.03 | | 6.1 |
| | A74 | 98 | 0.00 | | 5.1 |
| | A75 | 100 | 0.02 | | 5.9 |
| | A76 | 100 | 0.04 | | 4.4 |
| | A77 | 100 | 0.03 | | 5.3 |

TABLE 1-4

AN AMOUNT OF FLOURIDE, METAL OXIDE, METAL CARBONATE, AND Fe POWDER
(MASS % WITH RESPECT TO THE TOTAL MASS OF FLUX-CORED WIRE)

| CATEGORY | WIRE NO. | METAL FLUORIDE | | | | | | METAL OXIDE | | | | | | CaCO$_3$ | Fe POWDER |
|---|---|---|---|---|---|---|---|---|---|---|---|---|---|---|---|
| | | CaF$_2$ | BaF$_2$ | SrF$_2$ | MgF$_2$ | LiF | TOTAL | TiO$_2$ | SiO$_2$ | ZrO$_2$ | Al$_2$O$_3$ | MgO | TOTAL | | |
| COMPAR- ATIVE EXAMPLE | B01 | 5.6 | — | — | — | — | 5.6 | 0.49 | 0.42 | — | — | — | 0.91 | 0.18 | 4.6 |
| | B02 | 4.3 | — | — | — | — | 4.3 | 0.27 | 0.57 | — | — | 0.16 | 1.00 | 0.26 | — |
| | B03 | 4.1 | — | — | — | — | 4.1 | 0.24 | 0.47 | — | — | — | 0.71 | 0.23 | — |
| | B04 | 5.1 | — | — | — | — | 5.1 | 0.14 | 0.60 | — | — | — | 0.74 | 0.49 | 0.1 |
| | B05 | 4.1 | — | 0.2 | — | — | 4.3 | 0.27 | 0.60 | — | — | — | 0.87 | 0.16 | — |
| | B06 | 3.8 | — | — | 0.3 | — | 4.1 | 0.44 | 0.35 | — | — | — | 0.79 | 0.47 | — |
| | B07 | 4.7 | — | — | — | — | 4.7 | 0.25 | 0.59 | — | — | — | 0.84 | 0.29 | — |
| | B08 | 5.7 | — | — | — | — | 5.7 | 0.30 | 0.45 | — | — | — | 0.75 | 0.16 | — |
| | B09 | 4.3 | — | — | — | — | 4.3 | 0.50 | 0.43 | — | — | — | 0.93 | 0.47 | — |
| | B10 | 5.1 | 0.2 | — | — | — | 5.3 | 0.30 | 0.36 | — | — | — | 0.66 | 0.31 | — |
| | B11 | 3.6 | — | — | — | — | 3.6 | 0.36 | 0.52 | 0.26 | — | — | 1.14 | 0.45 | 9.3 |
| | B12 | 3.6 | — | — | — | — | 3.6 | 0.45 | 0.36 | — | — | — | 0.81 | 0.38 | — |
| | B13 | 4.1 | — | — | — | — | 4.1 | 0.25 | 0.59 | — | — | — | 0.84 | 0.19 | — |
| | B14 | 5.2 | — | 0.4 | — | — | 5.6 | 0.47 | 0.50 | — | — | — | 0.97 | 0.50 | — |
| | B15 | 3.6 | — | — | — | — | 3.6 | 0.27 | 0.31 | — | — | — | 0.58 | 0.20 | 1.0 |
| | B16 | 4.9 | — | — | — | — | 4.9 | 0.46 | 0.35 | — | — | — | 0.81 | 0.39 | — |
| | B17 | 4.0 | — | — | — | — | 4.0 | 0.15 | 0.26 | — | — | — | 0.41 | 0.22 | — |
| | B18 | 3.8 | — | — | 0.4 | — | 4.2 | 0.28 | 0.59 | — | — | — | 0.87 | 0.32 | — |
| | B19 | 5.7 | — | — | — | — | 5.7 | 0.18 | 0.53 | — | — | — | 0.71 | 0.41 | — |
| | B20 | 5.6 | — | — | — | — | 5.6 | 0.28 | 0.34 | — | — | — | 0.62 | 0.29 | — |
| | B21 | 4.8 | — | — | — | — | 4.8 | 0.37 | 0.40 | — | — | — | 0.77 | 0.19 | — |
| | B22 | 4.4 | 0.3 | — | 0.1 | — | 4.8 | 0.40 | 0.46 | — | — | — | 0.86 | 0.38 | 6.4 |
| | B23 | 3.8 | — | — | — | — | 3.8 | 0.36 | 0.33 | — | 0.19 | — | 0.88 | 0.16 | — |
| | B24 | 3.7 | — | — | — | — | 3.7 | 0.36 | 0.34 | — | — | — | 0.70 | 0.27 | 7.5 |
| | B25 | 4.6 | — | — | — | — | 4.6 | 0.27 | 0.53 | — | 0.36 | — | 1.16 | 0.17 | — |
| | B26 | 4.2 | — | — | — | — | 4.2 | 0.33 | 0.49 | — | — | — | 0.82 | 0.32 | — |
| | B27 | 5.4 | — | — | — | — | 5.4 | 0.34 | 0.52 | — | — | — | 0.86 | 0.14 | — |
| | B28 | 4.3 | — | — | — | — | 4.3 | 0.30 | 0.45 | — | — | — | 0.75 | 0.37 | 6.8 |
| | B29 | 3.2 | — | — | — | — | 3.2 | 0.11 | 0.39 | — | — | — | 0.50 | 0.41 | 2.1 |
| | B30 | 6.2 | — | — | — | — | 6.2 | 0.24 | 0.39 | — | — | — | 0.63 | 0.38 | 2.0 |
| | B31 | 4.2 | 0.1 | — | 0.1 | — | 4.4 | 0.24 | 0.14 | — | — | — | 0.38 | 0.21 | — |
| | B32 | 4.0 | — | — | — | — | 4.0 | 0.52 | 0.72 | — | — | — | 1.23 | 0.19 | 0.8 |
| | B33 | 4.2 | — | — | — | — | 4.2 | 0.16 | 0.39 | — | — | — | 0.55 | 0.58 | 2.1 |
| | B34 | 5.1 | — | 0.2 | — | — | 5.3 | 0.40 | 0.43 | — | — | — | 0.83 | 0.06 | — |
| | B35 | 4.1 | — | — | — | — | 4.1 | 0.48 | 0.47 | — | — | — | 0.95 | 0.23 | 10.5 |
| | B36 | 0 | 1.6 | 0.5 | 2.1 | — | 4.2 | 0.45 | 0.43 | — | — | — | 0.88 | 0.18 | — |

| CATEGORY | WIRE NO. | MASS RATIO OF CaF$_2$ WITH RESPECT TO TOTAL AMOUNT OF METAL FLUORIDE (%) | AMOUNT OF CaO (MASS %) | REMARKS | TOTAL AMOUNT [α]/ TOTAL AMOUNT [β] |
|---|---|---|---|---|---|
| COMPAR- ATIVE EXAMPLE | B01 | 100 | 0.04 | | 6.2 |
| | B02 | 100 | 0.12 | | 4.3 |
| | B03 | 100 | 0.00 | | 5.8 |
| | B04 | 100 | 0.02 | | 6.9 |
| | B05 | 95 | 0.00 | | 4.9 |
| | B06 | 93 | 0.06 | | 5.2 |
| | B07 | 100 | 0.04 | | 5.6 |
| | B08 | 100 | 0.00 | | 7.6 |
| | B09 | 100 | 0.07 | | 4.6 |
| | B10 | 96 | 0.00 | | 8.0 |
| | B11 | 100 | 0.04 | | 3.2 |
| | B12 | 100 | 0.02 | | 4.4 |
| | B13 | 100 | 0.05 | | 4.9 |
| | B14 | 93 | 0.00 | | 5.8 |
| | B15 | 100 | 0.02 | | 6.2 |
| | B16 | 100 | 0.05 | | 6.0 |
| | B17 | 100 | 0.03 | | 9.8 |
| | B18 | 90 | 0.02 | APPLYING PFPE OIL | 4.8 |
| | B19 | 100 | 0.00 | | 8.0 |
| | B20 | 100 | 0.05 | | 9.0 |
| | B21 | 100 | 0.06 | | 6.2 |
| | B22 | 92 | 0.00 | | 5.6 |
| | B23 | 100 | 0.04 | | 4.3 |
| | B24 | 100 | 0.02 | | 5.3 |
| | B25 | 100 | 0.00 | | 4.0 |
| | B26 | 100 | 0.08 | | 5.1 |
| | B27 | 100 | 0.04 | | 6.3 |
| | B28 | 100 | 0.01 | | 5.7 |
| | B29 | 100 | 0.00 | | 6.4 |
| | B30 | 100 | 0.00 | | 9.8 |

TABLE 1-4-continued

| | | | |
|---|---|---|---|
| B31 | 95 | 0.04 | 11.6 |
| B32 | 100 | 0.00 | 3.3 |
| B33 | 100 | 0.06 | 7.6 |
| B34 | 96 | 0.04 | 6.4 |
| B35 | 100 | 0.03 | 4.3 |
| B36 | 0 | 0.03 | 4.8 |

TABLE 1-5

AN AMOUNT OF FLUORIDE, METAL OXIDE, METAL CARBONATE, AND Fe POWDER(MASS % WITH RESPECT TO THE TOTAL MASS OF FLUX-CORED WIRE)

| CATEGORY | WIRE NO. | METAL FLUORIDE | | | | | | METAL OXIDE | | | | | | $CaCO_3$ | Fe POWDER |
|---|---|---|---|---|---|---|---|---|---|---|---|---|---|---|---|
| | | $CaF_2$ | $BaF_2$ | $SrF_2$ | $MgF_2$ | LiF | TOTAL | $TiO_2$ | $SiO_2$ | $ZrO_2$ | $Al_2O_3$ | MgO | TOTAL | | |
| COMPARATIVE EXAMPLE | B37 | — | — | — | — | — | 0.0 | 0.15 | 0.24 | — | — | — | 0.39 | 0.15 | 1.8 |
| | B38 | — | — | — | — | — | 0.0 | 0.85 | 0.22 | — | — | — | 1.07 | 0.24 | — |
| | B39 | — | — | — | — | — | 0.0 | — | — | — | — | — | 0.00 | — | — |
| | B40 | — | — | — | — | — | 0.0 | — | — | — | — | — | 0.00 | — | — |
| | B41 | — | — | 3.9 | 0.6 | — | 4.5 | 0.20 | 1.30 | — | — | — | 1.50 | — | 1.4 |
| | B42 | 2.9 | — | — | — | — | 2.9 | 0.70 | 0.70 | — | — | — | 1.40 | — | 1.7 |
| | B43 | 3.6 | — | — | — | — | 3.6 | 0.23 | 0.40 | — | — | — | 0.63 | 0.12 | 1.3 |
| | B44 | 3.4 | — | — | — | — | 3.4 | 0.25 | 0.36 | — | — | — | 0.61 | 0.28 | — |

| CATEGORY | WIRE NO. | MASS RATIO OF $CaF_2$ WITH RESPECT TO TOTAL AMOUNT OF METAL FLUORIDE (%) | AMOUNT OF CaO (MASS %) | REMARKS | TOTAL AMOUNT [α]/ TOTAL AMOUNT [β] |
|---|---|---|---|---|---|
| COMPARATIVE EXAMPLE | B37 | 0 | 0.06 | | 0.0 |
| | B38 | 0 | 0.00 | | 0.0 |
| | B39 | 0 | 0.00 | SW | — |
| | B40 | 0 | 0.00 | SW | — |
| | B41 | 0 | 3.52 | | 3.0 |
| | B42 | 100 | 1.73 | | 2.1 |
| | B43 | 100 | 0.26 | | 5.7 |
| | B44 | 100 | 0.42 | | 5.6 |

SW: SOLID WIRE

TABLE 1-6

AN AMOUNT OF FLUORIDE, METAL OXIDE, METAL CARBONATE, AND Fe POWDER(MASS % WITH RESPECT TO THE TOTAL MASS OF FLUX-CORED WIRE)

| CATEGORY | WIRE NO. | METAL FLUORIDE | | | | | | METAL OXIDE | | | | | | $CaCO_3$ | Fe POWDER |
|---|---|---|---|---|---|---|---|---|---|---|---|---|---|---|---|
| | | $CaF_2$ | $BaF_2$ | $SrF_2$ | $MgF_2$ | LiF | TOTAL | $TiO_2$ | $SiO_2$ | $ZrO_2$ | $Al_2O_3$ | MgO | TOTAL | | |
| EXAMPLE | A78 | 4.2 | — | — | — | — | 4.2 | 0.25 | 0.32 | — | — | — | 0.57 | $BaCO_3$: 0.20 | — |
| | A79 | 4.5 | — | — | — | — | 4.5 | 0.22 | 0.28 | — | — | — | 0.50 | $SrCO_3$: 0.20 | — |
| | A80 | 3.6 | — | — | — | — | 3.6 | 0.20 | 0.40 | — | — | — | 0.60 | $MgCO_3$: 0.20 | — |
| | A81 | 4.0 | — | — | — | — | 4.0 | 0.28 | 0.25 | — | — | — | 0.53 | $Li_2CO_3$: 0.20 | — |
| | A82 | 3.8 | — | — | — | — | 3.8 | 0.24 | 0.35 | — | — | — | 0.59 | $CaCO_3$: 0.10 $BaCO_3$: 0.10 | — |
| | A83 | 3.6 | — | — | — | 0.2 | 3.6 | 0.23 | 0.31 | — | — | — | 0.54 | $CaCO_3$: 0.20 | — |
| | A84 | 3.2 | 0.2 | 0.2 | — | 0.1 | 3.6 | 0.20 | 0.28 | — | — | — | 0.48 | $CaCO_3$: 0.20 | — |
| | A85 | 3.7 | — | — | — | 0.1 | 3.7 | 0.22 | 0.34 | — | — | — | 0.56 | $CaCO_3$: 0.20 | — |

TABLE 1-6-continued

| CATEGORY | WIRE NO. | MASS RATIO OF CaF$_2$ WITH RESPECT TO TOTAL AMOUNT OF METAL FLUORIDE (%) | AMOUNT OF CaO (MASS %) | REMARKS | TOTAL AMOUNT [α]/ TOTAL AMOUNT [β] |
|---|---|---|---|---|---|
| EXAMPLE | A78 | 100 | 0.00 | | 7.4 |
| | A79 | 100 | 0.08 | | 9.0 |
| | A80 | 100 | 0.00 | | 6.0 |
| | A81 | 100 | 0.04 | | 7.5 |
| | A82 | 100 | 0.00 | | 6.4 |
| | A83 | 100 | 0.08 | | 6.7 |
| | A84 | 89 | 0.00 | HAVING SEAM | 7.5 |
| | A85 | 100 | 0.03 | HAVING SEAM | 6.6 |

TABLE 2-1

| | | CHEMICAL COMPOSITION OF FLUX-CORED WIRE EXCLUDING CHEMICAL COMPOSITION OF FLUORIDE, METAL OXIDE, AND METAL CARBONATE (MASS % WITH RESPECT TO THE TOTAL MASS OF FLUX-CORED WIRE) | | | | | | | | | | |
|---|---|---|---|---|---|---|---|---|---|---|---|---|
| CATEGORY | WIRE NO. | C | Si | Mn | P | S | Ni | Al | Mo | Cu | Cr | V |
| EXAMPLE | A01 | 0.065 | 0.43 | 1.6 | 0.011 | 0.013 | 2.86 | 0.003 | 0.77 | 0.00 | — | — |
| | A02 | 0.050 | 0.35 | 1.5 | 0.009 | 0.015 | 1.71 | 0.038 | 0.50 | 0.35 | 0.32 | — |
| | A03 | 0.071 | 0.52 | 2.2 | 0.019 | 0.009 | 2.36 | 0.015 | 0.36 | 0.45 | 0.15 | — |
| | A04 | 0.060 | 0.34 | 2.2 | 0.015 | 0.014 | 3.30 | 0.019 | 0.50 | — | — | — |
| | A05 | 0.059 | 0.34 | 1.9 | 0.019 | 0.006 | 2.29 | 0.032 | 0.75 | 0.19 | 0.31 | 0.02 |
| | A06 | 0.076 | 0.58 | 2.3 | 0.018 | 0.015 | 1.52 | 0.007 | 0.70 | — | 0.15 | — |
| | A07 | 0.065 | 0.95 | 1.6 | 0.012 | 0.005 | 2.20 | 0.024 | 0.51 | 0.23 | — | — |
| | A08 | 0.051 | 0.30 | 1.9 | 0.013 | 0.008 | 2.22 | 0.039 | 0.87 | — | — | 0.02 |
| | A09 | 0.068 | 0.50 | 2.1 | 0.013 | 0.006 | 2.45 | 0.006 | 0.60 | — | 0.30 | — |
| | A10 | 0.081 | 0.36 | 2.0 | 0.008 | 0.006 | 2.84 | 0.006 | 0.68 | — | — | — |
| | A11 | 0.056 | 0.49 | 1.4 | 0.008 | 0.015 | 3.46 | 0.006 | 0.77 | — | — | — |
| | A12 | 0.056 | 0.56 | 1.3 | 0.017 | 0.010 | 2.63 | 0.044 | 0.86 | — | — | — |
| | A13 | 0.040 | 0.95 | 1.6 | 0.013 | 0.013 | 2.96 | 0.045 | 0.76 | — | — | — |
| | A14 | 0.079 | 0.76 | 1.9 | 0.010 | 0.012 | 2.34 | 0.042 | 0.64 | — | 0.30 | — |
| | A15 | 0.082 | 0.33 | 1.7 | 0.019 | 0.010 | 2.93 | 0.025 | 0.37 | 0.17 | 0.12 | — |
| | A16 | 0.071 | 0.41 | 2.1 | 0.010 | 0.013 | 2.41 | 0.036 | 0.67 | — | — | — |
| | A17 | 0.073 | 0.59 | 1.9 | 0.019 | 0.010 | 3.05 | 0.004 | 0.78 | — | — | — |
| | A18 | 0.075 | 0.96 | 2.1 | 0.019 | 0.005 | 2.60 | 0.002 | 0.85 | — | — | 0.03 |
| | A19 | 0.046 | 0.95 | 1.3 | 0.019 | 0.006 | 2.55 | 0.012 | 0.74 | — | — | — |
| | A20 | 0.083 | 0.45 | 1.5 | 0.009 | 0.005 | 2.72 | 0.029 | 0.51 | 0.15 | 0.23 | — |
| | A21 | 0.054 | 0.40 | 1.3 | 0.017 | 0.005 | 3.02 | 0.028 | 0.63 | — | 0.15 | 0.03 |
| | A22 | 0.074 | 0.51 | 1.0 | 0.008 | 0.007 | 2.91 | 0.027 | 0.89 | — | — | — |
| | A23 | 0.059 | 0.53 | 2.2 | 0.012 | 0.006 | 2.02 | 0.001 | 0.85 | — | — | — |
| | A24 | 0.046 | 0.80 | 1.7 | 0.014 | 0.008 | 3.12 | 0.005 | 0.59 | 0.21 | — | — |
| | A25 | 0.060 | 0.97 | 1.8 | 0.009 | 0.007 | 2.84 | 0.044 | 0.89 | — | — | — |
| | A26 | 0.081 | 0.80 | 2.3 | 0.009 | 0.009 | 2.38 | 0.032 | 0.75 | — | — | — |
| | A27 | 0.047 | 0.69 | 2.2 | 0.011 | 0.007 | 1.86 | 0.045 | 0.30 | — | — | — |
| | A28 | 0.065 | 0.35 | 1.9 | 0.018 | 0.010 | 2.50 | 0.026 | 0.88 | — | — | 0.04 |
| | A29 | 0.082 | 0.34 | 1.9 | 0.011 | 0.014 | 2.78 | 0.050 | 0.78 | 0.19 | — | — |
| | A30 | 0.056 | 0.44 | 2.5 | 0.015 | 0.015 | 2.09 | 0.014 | 0.55 | — | — | — |
| | A31 | 0.064 | 0.47 | 1.6 | 0.011 | 0.013 | 2.35 | 0.022 | 0.81 | — | 0.30 | — |
| | A32 | 0.062 | 0.76 | 2.2 | 0.015 | 0.008 | 2.61 | 0.041 | 0.47 | — | — | — |

| | | CHEMICAL COMPOSITION OF FLUX-CORED WIRE EXCLUDING CHEMICAL COMPOSITION OF FLUORIDE, METAL OXIDE, AND METAL CARBONATE (MASS % WITH RESPECT TO THE TOTAL MASS OF FLUX-CORED WIRE) | | | | | | | (½) × Mn + |
|---|---|---|---|---|---|---|---|---|---|
| CATEGORY | WIRE NO. | Ti | Nb | B | Ca | REM | OTHERS | Ceq | Ni + 3 × Cr |
| EXAMPLE | A01 | — | — | — | — | — | REMAINDER | 0.61 | 3.66 |
| | A02 | 0.023 | 0.07 | 0.0030 | — | — | REMAINDER | 0.55 | 3.42 |
| | A03 | 0.299 | 0.01 | 0.0082 | — | — | REMAINDER | 0.64 | 3.91 |
| | A04 | — | — | — | — | — | REMAINDER | 0.65 | 4.40 |
| | A05 | 0.236 | 0.07 | 0.0094 | 0.257 | 0.0026 | REMAINDER | 0.70 | 4.17 |
| | A06 | — | — | — | — | — | REMAINDER | 0.73 | 3.12 |
| | A07 | — | — | — | — | — | REMAINDER | 0.55 | 3.00 |
| | A08 | — | — | — | — | — | REMAINDER | 0.65 | 3.17 |
| | A09 | 0.254 | — | 0.0006 | — | — | REMAINDER | 0.70 | 4.38 |
| | A10 | — | — | — | 0.499 | 0.0002 | REMAINDER | 0.67 | 3.84 |
| | A11 | — | — | — | 0.010 | 0.0049 | REMAINDER | 0.59 | 4.16 |
| | A12 | — | — | — | — | — | REMAINDER | 0.58 | 3.28 |
| | A13 | — | — | — | — | — | REMAINDER | 0.61 | 3.76 |

TABLE 2-1-continued

| Wire No. | Ti | Nb | B | Ca | REM | OTHERS | Ceq | (½) × Mn + Ni + 3 × Cr |
|---|---|---|---|---|---|---|---|---|
| A14 | 0.192 | 0.06 | 0.0092 | — | — | REMAINDER | 0.71 | 4.19 |
| A15 | 0.160 | 0.05 | — | — | — | REMAINDER | 0.57 | 4.14 |
| A16 | — | — | — | — | — | REMAINDER | 0.67 | 3.46 |
| A17 | — | — | — | 0.237 | 0.0098 | REMAINDER | 0.69 | 4.00 |
| A18 | — | — | — | — | — | REMAINDER | 0.74 | 3.65 |
| A19 | — | — | — | — | — | REMAINDER | 0.55 | 3.20 |
| A20 | — | — | 0.0073 | — | 0.0061 | REMAINDER | 0.59 | 4.16 |
| A21 | — | 0.03 | — | 0.420 | 0.0047 | REMAINDER | 0.55 | 4.12 |
| A22 | — | — | — | — | — | REMAINDER | 0.56 | 3.41 |
| A23 | — | — | — | — | — | REMAINDER | 0.71 | 3.12 |
| A24 | — | — | — | 0.280 | — | REMAINDER | 0.59 | 3.97 |
| A25 | 0.024 | — | — | — | — | REMAINDER | 0.69 | 3.74 |
| A26 | — | — | — | — | — | REMAINDER | 0.74 | 3.53 |
| A27 | — | 0.03 | — | — | — | REMAINDER | 0.56 | 2.96 |
| A28 | — | — | — | — | — | REMAINDER | 0.68 | 3.45 |
| A29 | — | — | — | — | — | REMAINDER | 0.68 | 3.73 |
| A30 | — | — | — | — | — | REMAINDER | 0.68 | 3.34 |
| A31 | — | 0.03 | 0.0068 | — | — | REMAINDER | 0.67 | 4.05 |
| A32 | — | — | — | 0.242 | 0.0080 | REMAINDER | 0.64 | 3.71 |

TABLE 2-2

| CATEGORY | WIRE NO. | CHEMICAL COMPOSITION OF FLUX-CORED WIRE EXCLUDING CHEMICAL COMPOSITION OF FLUORIDE, METAL OXIDE, AND METAL CARBONATE (MASS % WITH RESPECT TO THE TOTAL MASS OF FLUX-CORED WIRE) | | | | | | | | | | |
|---|---|---|---|---|---|---|---|---|---|---|---|---|
| | | C | Si | Mn | P | S | Ni | Al | Mo | Cu | Cr | V |
| EXAMPLE | A33 | 0.067 | 0.43 | 2.0 | 0.017 | 0.006 | 2.52 | 0.047 | 0.69 | 0.26 | 0.20 | — |
| | A34 | 0.064 | 0.54 | 1.6 | 0.019 | 0.011 | 2.21 | 0.034 | 0.65 | — | — | — |
| | A35 | 0.080 | 0.65 | 1.9 | 0.012 | 0.013 | 3.20 | 0.041 | 0.69 | 0.19 | — | — |
| | A36 | 0.044 | 0.64 | 1.7 | 0.011 | 0.012 | 3.17 | 0.024 | 0.70 | — | — | — |
| | A37 | 0.051 | 0.30 | 1.8 | 0.013 | 0.013 | 2.10 | 0.037 | 0.43 | — | — | 0.04 |
| | A38 | 0.082 | 0.94 | 2.4 | 0.014 | 0.008 | 2.90 | 0.044 | 0.56 | — | — | — |
| | A39 | 0.077 | 0.33 | 1.9 | 0.016 | 0.014 | 2.55 | 0.023 | 0.71 | 0.10 | 0.22 | — |
| | A40 | 0.060 | 0.70 | 1.4 | 0.009 | 0.008 | 3.02 | 0.022 | 0.69 | — | 0.14 | — |
| | A41 | 0.065 | 0.51 | 1.3 | 0.015 | 0.011 | 2.65 | 0.016 | 0.57 | — | — | — |
| | A42 | 0.044 | 0.54 | 1.8 | 0.015 | 0.005 | 2.30 | 0.042 | 1.00 | — | — | — |
| | A43 | 0.043 | 0.89 | 2.0 | 0.008 | 0.009 | 2.27 | 0.005 | 0.67 | 0.50 | 0.10 | — |
| | A44 | 0.079 | 0.64 | 1.2 | 0.010 | 0.007 | 2.40 | 0.011 | 0.85 | 0.36 | 0.45 | — |
| | A45 | 0.070 | 0.38 | 2.4 | 0.016 | 0.013 | 1.60 | 0.009 | 0.46 | 0.17 | 0.50 | — |
| | A46 | 0.053 | 0.67 | 2.0 | 0.015 | 0.008 | 2.02 | 0.012 | 0.88 | — | — | — |
| | A47 | 0.071 | 0.41 | 1.3 | 0.012 | 0.009 | 2.10 | 0.010 | 0.76 | 0.31 | 0.20 | — |
| | A48 | 0.090 | 0.91 | 2.1 | 0.012 | 0.009 | 3.10 | 0.046 | 0.52 | — | — | — |
| | A49 | 0.072 | 0.89 | 1.6 | 0.011 | 0.008 | 2.50 | 0.009 | 0.97 | — | 0.14 | — |
| | A50 | 0.072 | 1.00 | 1.8 | 0.008 | 0.009 | 2.66 | 0.014 | 0.85 | — | — | — |
| | A51 | 0.047 | 0.72 | 2.0 | 0.017 | 0.009 | 2.46 | 0.025 | 0.41 | — | — | 0.03 |
| | A52 | 0.047 | 0.94 | 1.3 | 0.008 | 0.010 | 3.11 | 0.025 | 0.66 | — | 0.10 | — |
| | A53 | 0.087 | 0.38 | 1.4 | 0.010 | 0.014 | 2.85 | 0.027 | 0.77 | — | — | — |
| | A54 | 0.079 | 0.95 | 1.9 | 0.016 | 0.007 | 2.38 | 0.015 | 0.95 | — | — | — |
| | A55 | 0.074 | 0.39 | 2.2 | 0.008 | 0.012 | 2.12 | 0.022 | 0.47 | 0.13 | 0.17 | — |
| | A56 | 0.082 | 0.38 | 1.4 | 0.014 | 0.012 | 3.04 | 0.014 | 0.90 | 0.37 | 0.12 | — |
| | A57 | 0.064 | 0.84 | 1.9 | 0.014 | 0.006 | 3.18 | 0.037 | 0.85 | — | — | — |
| | A58 | 0.064 | 0.67 | 2.0 | 0.014 | 0.006 | 2.86 | 0.047 | 0.38 | 0.38 | 0.10 | — |
| | A59 | 0.069 | 0.39 | 1.9 | 0.015 | 0.008 | 2.74 | 0.016 | 0.52 | — | — | — |
| | A60 | 0.072 | 0.89 | 1.4 | 0.013 | 0.011 | 2.71 | 0.006 | 0.90 | 0.34 | 0.25 | 0.02 |
| | A61 | 0.043 | 0.72 | 1.8 | 0.014 | 0.010 | 2.40 | 0.023 | 0.42 | — | — | — |
| | A62 | 0.060 | 0.63 | 2.0 | 0.009 | 0.007 | 2.02 | 0.043 | 0.34 | 0.34 | 0.21 | — |

| CATEGORY | WIRE NO. | CHEMICAL COMPOSITION OF FLUX-CORED WIRE EXCLUDING CHEMICAL COMPOSITION OF FLUORIDE, METAL OXIDE, AND METAL CARBONATE (MASS % WITH RESPECT TO THE TOTAL MASS OF FLUX-CORED WIRE) | | | | | | Ceq | (½) × Mn + Ni + 3 × Cr |
|---|---|---|---|---|---|---|---|---|---|
| | | Ti | Nb | B | Ca | REM | OTHERS | | |
| EXAMPLE | A33 | — | — | — | — | 0.0097 | REMAINDER | 0.69 | 4.12 |
| | A34 | — | — | — | — | — | REMAINDER | 0.57 | 3.01 |
| | A35 | — | — | — | — | — | REMAINDER | 0.68 | 4.15 |
| | A36 | — | — | — | — | — | REMAINDER | 0.61 | 4.02 |
| | A37 | — | — | — | — | — | REMAINDER | 0.53 | 3.00 |
| | A38 | — | — | — | — | — | REMAINDER | 0.73 | 4.10 |
| | A39 | — | 0.04 | 0.0053 | — | — | REMAINDER | 0.69 | 4.16 |
| | A40 | 0.251 | — | 0.0099 | — | — | REMAINDER | 0.60 | 4.14 |
| | A41 | — | — | — | — | — | REMAINDER | 0.51 | 3.30 |

TABLE 2-2-continued

| Wire No. | Ti | Nb | B | Ca | REM | OTHERS | Ceq | (½) × Mn + Ni + 3 × Cr |
|---|---|---|---|---|---|---|---|---|
| A42 | — | — | — | — | — | REMAINDER | 0.67 | 3.20 |
| A43 | 0.054 | — | 0.0043 | — | — | REMAINDER | 0.66 | 3.57 |
| A44 | 0.124 | 0.04 | — | — | — | REMAINDER | 0.67 | 4.35 |
| A45 | 0.010 | 0.08 | 0.0061 | — | — | REMAINDER | 0.74 | 4.30 |
| A46 | — | — | — | — | — | REMAINDER | 0.68 | 3.02 |
| A47 | 0.177 | 0.04 | 0.0034 | — | — | REMAINDER | 0.59 | 3.35 |
| A48 | — | — | — | — | — | REMAINDER | 0.69 | 4.15 |
| A49 | — | 0.10 | 0.0003 | — | — | REMAINDER | 0.71 | 3.72 |
| A50 | — | — | — | — | — | REMAINDER | 0.69 | 3.56 |
| A51 | — | — | — | — | — | REMAINDER | 0.58 | 3.46 |
| A52 | — | — | — | — | — | REMAINDER | 0.57 | 4.06 |
| A53 | — | — | — | — | — | REMAINDER | 0.60 | 3.55 |
| A54 | — | — | 0.0056 | — | — | REMAINDER | 0.73 | 3.33 |
| A55 | 0.146 | 0.06 | 0.0092 | — | — | REMAINDER | 0.66 | 3.73 |
| A56 | 0.015 | 0.05 | 0.0042 | — | — | REMAINDER | 0.66 | 4.10 |
| A57 | — | — | — | — | — | REMAINDER | 0.71 | 4.13 |
| A58 | 0.225 | — | — | 0.498 | 0.0003 | REMAINDER | 0.61 | 4.16 |
| A59 | — | — | — | 0.094 | — | REMAINDER | 0.60 | 3.69 |
| A60 | 0.114 | 0.08 | 0.0070 | 0.092 | 0.0003 | REMAINDER | 0.69 | 4.16 |
| A61 | — | — | — | — | — | REMAINDER | 0.54 | 3.30 |
| A62 | 0.013 | 0.04 | 0.0019 | — | — | REMAINDER | 0.60 | 3.65 |

TABLE 2-3

| CATEGORY | WIRE NO. | CHEMICAL COMPOSITION OF FLUX-CORED WIRE EXCLUDING CHEMICAL COMPOSITION OF FLUORIDE, METAL OXIDE, AND METAL CARBONATE (MASS % WITH RESPECT TO THE TOTAL MASS OF FLUX-CORED WIRE) | | | | | | | | | | | | | | | | Ceq | (½) × Mn + Ni + 3 × Cr |
|---|---|---|---|---|---|---|---|---|---|---|---|---|---|---|---|---|---|---|---|
| | | C | Si | Mn | P | S | Ni | Al | Mo | Cu | Cr | V | Ti | Nb | B | Ca | REM | OTHERS | | |
| EXAMPLE | A63 | 0.042 | 0.30 | 1.6 | 0.012 | 0.004 | 2.32 | 0.016 | 0.62 | — | — | — | — | — | — | — | — | REMAINDER | 0.53 | 3.12 |
| | A64 | 0.069 | 0.42 | 2.1 | 0.010 | 0.005 | 2.54 | 0.015 | 0.96 | — | — | — | — | — | — | — | — | REMAINDER | 0.74 | 3.59 |
| | A65 | 0.064 | 0.35 | 2.5 | 0.011 | 0.007 | 2.11 | 0.022 | 0.78 | — | — | — | — | — | — | — | — | REMAINDER | 0.74 | 3.36 |
| | A66 | 0.045 | 0.58 | 1.7 | 0.014 | 0.005 | 2.89 | 0.010 | 0.62 | — | — | — | — | — | — | — | — | REMAINDER | 0.58 | 3.74 |
| | A67 | 0.058 | 0.52 | 2.0 | 0.008 | 0.005 | 2.64 | 0.013 | 0.65 | 0.22 | 0.12 | 0.04 | 0.015 | 0.01 | 0.0021 | 0.120 | 0.0008 | REMAINDER | 0.67 | 4.00 |
| | A68 | 0.055 | 0.46 | 1.8 | 0.007 | 0.006 | 2.10 | 0.018 | 0.68 | — | 0.30 | — | 0.016 | — | 0.0032 | — | — | REMAINDER | 0.66 | 3.90 |
| | A69 | 0.061 | 0.32 | 1.8 | 0.006 | 0.004 | 2.55 | 0.028 | 0.74 | 0.29 | — | 0.02 | — | — | — | 0.160 | — | REMAINDER | 0.62 | 3.45 |
| | A70 | 0.068 | 0.45 | 2.2 | 0.008 | 0.005 | 2.43 | 0.015 | 0.85 | — | — | — | 0.038 | — | — | — | 0.0026 | REMAINDER | 0.73 | 3.53 |
| | A71 | 0.077 | 0.48 | 2.0 | 0.012 | 0.006 | 2.65 | 0.034 | 0.65 | 0.20 | — | — | — | 0.02 | 0.0018 | — | — | REMAINDER | 0.66 | 3.65 |
| | A72 | 0.065 | 0.40 | 1.6 | 0.010 | 0.003 | 2.41 | 0.013 | 0.98 | — | 0.23 | 0.03 | — | — | — | — | — | REMAINDER | 0.70 | 3.90 |
| | A73 | 0.068 | 0.42 | 1.8 | 0.010 | 0.006 | 2.67 | 0.015 | 0.70 | 0.25 | — | — | 0.020 | — | 0.0015 | — | — | REMAINDER | 0.63 | 3.57 |
| | A74 | 0.070 | 0.35 | 2.0 | 0.011 | 0.005 | 2.12 | 0.018 | 0.64 | — | — | 0.02 | — | — | 0.0020 | — | — | REMAINDER | 0.63 | 3.12 |
| | A75 | 0.066 | 0.33 | 1.6 | 0.012 | 0.006 | 2.24 | 0.015 | 0.72 | — | 0.20 | — | — | 0.02 | — | — | — | REMAINDER | 0.62 | 3.64 |
| | A76 | 0.064 | 0.36 | 1.8 | 0.008 | 0.004 | 2.35 | 0.012 | 0.61 | 0.23 | — | — | 0.024 | — | — | 0.110 | — | REMAINDER | 0.59 | 3.25 |
| | A77 | 0.059 | 0.45 | 1.8 | 0.009 | 0.004 | 2.60 | 0.010 | 0.62 | — | — | 0.04 | — | — | 0.0028 | — | — | REMAINDER | 0.60 | 3.50 |

TABLE 2-4

| | | CHEMICAL COMPOSITION OF FLUX-CORED WIRE EXCLUDING CHEMICAL COMPOSITION OF FLUORIDE, METAL OXIDE, AND METAL CARBONATE (MASS % WITH RESPECT TO THE TOTAL MASS OF FLUX-CORED WIRE) | | | | | | | | | | |
|---|---|---|---|---|---|---|---|---|---|---|---|---|
| CATEGORY | WIRE NO. | C | Si | Mn | P | S | Ni | Al | Mo | Cu | Cr | V |
| EXAMPLE | B01 | 0.032 | 0.79 | 1.9 | 0.011 | 0.011 | 2.86 | 0.040 | 0.77 | — | — | — |
| | B02 | 0.102 | 0.39 | 1.8 | 0.017 | 0.006 | 2.69 | 0.036 | 0.70 | — | — | — |
| | B03 | 0.062 | 0.26 | 1.6 | 0.016 | 0.005 | 2.61 | 0.003 | 0.42 | — | — | 0.03 |
| | B04 | 0.044 | 1.06 | 1.9 | 0.010 | 0.013 | 2.57 | 0.046 | 0.34 | 0.22 | — | — |
| | B05 | 0.081 | 0.51 | 0.9 | 0.013 | 0.014 | 3.14 | 0.037 | 0.90 | — | — | — |
| | B06 | 0.086 | 0.53 | 2.6 | 0.016 | 0.008 | 2.66 | 0.046 | 0.45 | — | — | — |
| | B07 | 0.056 | 0.79 | 1.8 | 0.035 | 0.007 | 2.85 | 0.037 | 0.79 | 0.42 | — | — |
| | B08 | 0.076 | 0.40 | 2.1 | 0.014 | 0.026 | 2.35 | 0.015 | 0.39 | 0.23 | 0.14 | — |
| | B09 | 0.064 | 0.62 | 2.4 | 0.012 | 0.008 | 1.45 | 0.015 | 0.68 | — | 0.16 | — |
| | B10 | 0.083 | 0.75 | 1.2 | 0.013 | 0.015 | 3.58 | 0.024 | 0.55 | — | — | — |
| | B11 | 0.064 | 0.39 | 2.2 | 0.009 | 0.009 | 1.89 | 0.000 | 0.65 | — | — | — |
| | B12 | 0.047 | 0.63 | 1.9 | 0.013 | 0.006 | 2.12 | 0.059 | 0.40 | — | — | — |
| | B13 | 0.066 | 0.75 | 1.8 | 0.012 | 0.014 | 2.96 | 0.035 | 0.24 | — | — | — |
| | B14 | 0.056 | 0.50 | 1.8 | 0.011 | 0.006 | 2.47 | 0.004 | 1.06 | — | — | — |
| | B15 | 0.055 | 0.55 | 1.4 | 0.011 | 0.005 | 2.99 | 0.008 | 0.58 | 0.58 | 0.10 | — |
| | B16 | 0.068 | 0.71 | 1.3 | 0.016 | 0.009 | 1.83 | 0.003 | 0.33 | 0.46 | 0.54 | — |
| | B17 | 0.070 | 0.42 | 1.8 | 0.010 | 0.004 | 2.62 | 0.013 | 0.53 | 0.24 | — | 0.05 |
| | B18 | 0.069 | 0.36 | 1.9 | 0.008 | 0.012 | 3.00 | 0.019 | 0.65 | 0.15 | — | — |
| | B19 | 0.085 | 0.41 | 1.8 | 0.015 | 0.009 | 2.57 | 0.033 | 0.78 | 0.37 | — | — |
| | B20 | 0.081 | 0.93 | 1.6 | 0.012 | 0.008 | 2.54 | 0.020 | 0.53 | 0.24 | 0.27 | — |
| | B21 | 0.076 | 0.62 | 2.2 | 0.018 | 0.012 | 1.98 | 0.045 | 0.44 | 0.29 | 0.35 | — |
| | B22 | 0.054 | 0.80 | 2.2 | 0.014 | 0.015 | 1.91 | 0.022 | 0.49 | 0.31 | 0.30 | — |
| | B23 | 0.043 | 0.67 | 1.4 | 0.008 | 0.011 | 2.51 | 0.029 | 0.89 | 0.41 | 0.24 | — |
| | B24 | 0.045 | 0.73 | 1.9 | 0.017 | 0.012 | 1.88 | 0.031 | 0.64 | 0.15 | 0.27 | — |
| | B25 | 0.082 | 0.45 | 2.2 | 0.015 | 0.006 | 2.45 | 0.029 | 0.96 | — | — | — |
| | B26 | 0.059 | 0.35 | 1.4 | 0.012 | 0.007 | 2.56 | 0.041 | 0.48 | — | — | 0.02 |
| | B27 | 0.047 | 0.77 | 1.4 | 0.012 | 0.005 | 2.05 | 0.028 | 0.79 | — | — | — |
| | B28 | 0.082 | 0.90 | 1.8 | 0.018 | 0.012 | 2.80 | 0.036 | 0.50 | — | 0.30 | — |
| | B29 | 0.076 | 0.51 | 1.6 | 0.009 | 0.015 | 3.03 | 0.036 | 0.67 | 0.24 | — | — |
| | B30 | 0.068 | 0.74 | 1.9 | 0.010 | 0.008 | 2.97 | 0.042 | 0.75 | — | — | — |
| | B31 | 0.079 | 0.36 | 1.8 | 0.014 | 0.006 | 2.33 | 0.018 | 0.43 | 0.18 | — | — |
| | B32 | 0.063 | 0.74 | 1.8 | 0.010 | 0.013 | 3.04 | 0.041 | 0.42 | — | — | — |
| | B33 | 0.079 | 0.42 | 1.6 | 0.017 | 0.014 | 3.19 | 0.029 | 0.35 | — | — | 0.03 |
| | B34 | 0.083 | 0.83 | 1.7 | 0.014 | 0.005 | 2.40 | 0.029 | 0.56 | — | — | — |
| | B35 | 0.044 | 0.83 | 2.1 | 0.018 | 0.014 | 2.01 | 0.027 | 0.34 | — | — | — |
| | B36 | 0.049 | 0.96 | 2.2 | 0.013 | 0.005 | 2.20 | 0.009 | 0.63 | 0.35 | 0.20 | — |

| | | CHEMICAL COMPOSITION OF FLUX-CORED WIRE EXCLUDING CHEMICAL COMPOSITION OF FLUORIDE, METAL OXIDE, AND METAL CARBONATE (MASS % WITH RESPECT TO THE TOTAL MASS OF FLUX-CORED WIRE) | | | | | | | |
|---|---|---|---|---|---|---|---|---|---|
| CATEGORY | WIRE NO. | Ti | Nb | B | Ca | REM | OTHERS | Ceq | (½) × Mn + Ni + 3 × Cr |
| EXAMPLE | B01 | — | — | — | — | — | REMAINDER | 0.65 | 3.81 |
| | B02 | — | — | — | — | — | REMAINDER | 0.66 | 3.59 |
| | B03 | — | — | — | — | — | REMAINDER | 0.51 | 3.41 |
| | B04 | — | — | 0.0020 | — | — | REMAINDER | 0.55 | 3.52 |
| | B05 | — | — | — | — | — | REMAINDER | 0.56 | 3.59 |
| | B06 | — | 0.02 | — | 0.310 | — | REMAINDER | 0.72 | 3.96 |
| | B07 | 0.074 | — | 0.0034 | — | 0.0083 | REMAINDER | 0.66 | 3.75 |
| | B08 | 0.115 | 0.04 | 0.0060 | 0.046 | 0.0036 | REMAINDER | 0.63 | 3.82 |
| | B09 | — | — | — | — | — | REMAINDER | 0.73 | 3.13 |
| | B10 | — | — | — | — | — | REMAINDER | 0.54 | 4.18 |
| | B11 | — | — | — | — | — | REMAINDER | 0.66 | 2.99 |
| | B12 | — | — | 0.0018 | — | — | REMAINDER | 0.54 | 3.07 |
| | B13 | — | — | — | — | — | REMAINDER | 0.53 | 3.86 |
| | B14 | — | — | — | — | — | REMAINDER | 0.70 | 3.37 |
| | B15 | 0.223 | 0.04 | 0.0025 | — | — | REMAINDER | 0.55 | 3.99 |
| | B16 | 0.165 | 0.08 | 0.0025 | — | — | REMAINDER | 0.55 | 4.10 |
| | B17 | 0.015 | — | — | — | — | REMAINDER | 0.59 | 3.52 |
| | B18 | 0.311 | 0.04 | 0.0086 | — | — | REMAINDER | 0.64 | 3.95 |
| | B19 | 0.117 | 0.11 | 0.0058 | — | — | REMAINDER | 0.66 | 3.47 |
| | B20 | 0.168 | 0.07 | 0.0107 | — | — | REMAINDER | 0.64 | 4.15 |
| | B21 | 0.020 | 0.01 | 0.0041 | 0.526 | 0.0047 | REMAINDER | 0.70 | 4.13 |
| | B22 | — | 0.09 | 0.0032 | 0.554 | — | REMAINDER | 0.68 | 3.91 |
| | B23 | 0.177 | — | 0.0021 | — | 0.0107 | REMAINDER | 0.64 | 3.93 |
| | B24 | 0.015 | 0.09 | 0.0021 | 0.131 | 0.0121 | REMAINDER | 0.65 | 3.64 |
| | B25 | — | — | — | — | — | REMAINDER | 0.77 | 3.55 |
| | B26 | — | — | — | — | 0.0008 | REMAINDER | 0.49 | 3.26 |
| | B27 | — | — | — | 0.268 | — | REMAINDER | 0.56 | 2.75 |
| | B28 | 0.127 | — | — | — | — | REMAINDER | 0.67 | 4.60 |

TABLE 2-4-continued

| | | | | | | | | |
|---|---|---|---|---|---|---|---|---|
| B29 | — | 0.04 | — | — | — | REMAINDER | 0.61 | 3.83 |
| B30 | — | — | — | — | — | REMAINDER | 0.68 | 3.92 |
| B31 | — | — | 0.0024 | — | — | REMAINDER | 0.56 | 3.23 |
| B32 | — | — | — | — | — | REMAINDER | 0.57 | 3.94 |
| B33 | — | — | — | — | — | REMAINDER | 0.53 | 3.99 |
| B34 | — | — | — | — | — | REMAINDER | 0.60 | 3.25 |
| B35 | — | — | 0.0028 | — | — | REMAINDER | 0.56 | 3.06 |
| B36 | 0.084 | 0.07 | — | 0.396 | 0.0015 | REMAINDER | 0.71 | 3.90 |

TABLE 2-5

| CATEGORY | WIRE NO. | CHEMICAL COMPOSITION OF FLUX-CORED WIRE EXCLUDING CHEMICAL COMPOSITION OF FLUORIDE, METAL OXIDE, AND METAL CARBONATE (MASS % WITH RESPECT TO THE TOTAL MASS OF FLUX-CORED WIRE) | | | | | | | | | | |
|---|---|---|---|---|---|---|---|---|---|---|---|---|
| | | C | Si | Mn | P | S | Ni | Al | Mo | Cu | Cr | V |
| COMPARATIVE EXAMPLE | B37 | 0.064 | 0.45 | 1.8 | 0.010 | 0.003 | 2.15 | 0.014 | 0.69 | 0.18 | — | — |
| | B38 | 0.049 | 0.64 | 2.1 | 0.012 | 0.005 | 2.43 | 0.022 | 0.42 | 0.21 | — | — |
| | B39 | 0.072 | 0.36 | 1.5 | 0.008 | 0.002 | 2.58 | 0.012 | 0.64 | 0.20 | — | — |
| | B40 | 0.078 | 0.32 | 1.6 | 0.006 | 0.002 | 1.82 | 0.008 | 0.32 | 0.24 | 0.29 | — |
| | B41 | 0.071 | 0.50 | 2.0 | 0.006 | 0.006 | 2.00 | — | 0.50 | — | 0.50 | 0.02 |
| | B42 | 0.120 | 0.50 | 2.0 | 0.014 | 0.016 | 1.30 | — | 0.20 | 0.65 | — | 0.04 |
| | B43 | 0.068 | 0.36 | 1.8 | 0.012 | 0.008 | 2.12 | 0.012 | 0.46 | 0.26 | — | — |
| | B44 | 0.073 | 0.42 | 2.0 | 0.013 | 0.007 | 2.31 | 0.016 | 0.55 | 0.22 | 0.22 | — |

| CATEGORY | WIRE NO. | CHEMICAL COMPOSITION OF FLUX-CORED WIRE EXCLUDING CHEMICAL COMPOSITION OF FLUORIDE, METAL OXIDE, AND METAL CARBONATE (MASS % WITH RESPECT TO THE TOTAL MASS OF FLUX-CORED WIRE) | | | | | | Ceq | ($\frac{1}{2}$) × Mn + Ni + 3 × Cr |
|---|---|---|---|---|---|---|---|---|---|
| | | Ti | Nb | B | Ca | REM | OTHERS | | |
| COMPARATIVE EXAMPLE | B37 | — | — | — | — | — | REMAINDER | 0.61 | 3.05 |
| | B38 | — | — | — | — | — | REMAINDER | 0.59 | 3.48 |
| | B39 | — | — | — | — | — | REMAINDER | 0.56 | 3.33 |
| | B40 | — | — | — | — | — | REMAINDER | 0.54 | 3.49 |
| | B41 | — | 0.02 | — | — | — | REMAINDER | 0.70 | 4.50 |
| | B42 | — | 0.01 | 0.0100 | — | — | REMAINDER | 0.56 | 2.30 |
| | B43 | 0.014 | — | — | — | — | REMAINDER | 0.55 | 3.02 |
| | B44 | — | — | — | — | — | REMAINDER | 0.66 | 3.97 |

TABLE 2-6

| CATEGORY | WIRE NO. | CHEMICAL COMPOSITION OF FLUX-CORED WIRE EXCLUDING CHEMICAL COMPOSITION OF FLUORIDE, METAL OXIDE, AND METAL CARBONATE (MASS % WITH RESPECT TO THE TOTAL MASS OF FLUX-CORED WIRE) | | | | | | | | | | |
|---|---|---|---|---|---|---|---|---|---|---|---|---|
| | | C | Si | Mn | P | S | Ni | Al | Mo | Cu | Cr | V |
| EXAMPLE | A78 | 0.060 | 0.55 | 1.8 | 0.011 | 0.008 | 2.52 | 0.012 | 0.53 | 0.24 | — | — |
| | A79 | 0.075 | 0.46 | 1.8 | 0.010 | 0.006 | 2.68 | 0.026 | 0.46 | 0.26 | 0.15 | — |
| | A80 | 0.055 | 0.58 | 2.0 | 0.012 | 0.008 | 2.58 | 0.010 | 0.66 | 0.18 | — | — |
| | A81 | 0.064 | 0.40 | 2.2 | 0.010 | 0.006 | 2.40 | 0.015 | 0.58 | — | — | 0.03 |
| | A82 | 0.058 | 0.35 | 2.0 | 0.011 | 0.005 | 2.25 | 0.018 | 0.65 | 0.24 | — | 0.02 |
| | A83 | 0.067 | 0.32 | 2.0 | 0.010 | 0.006 | 2.44 | 0.012 | 0.72 | 0.20 | 0.25 | — |
| | A84 | 0.062 | 0.30 | 2.0 | 0.012 | 0.005 | 2.10 | 0.015 | 0.56 | 0.18 | — | — |
| | A85 | 0.065 | 0.43 | 1.8 | 0.010 | 0.005 | 1.95 | 0.036 | 0.63 | 0.23 | 0.20 | 0.02 |

| CATEGORY | WIRE NO. | CHEMICAL COMPOSITION OF FLUX-CORED WIRE EXCLUDING CHEMICAL COMPOSITION OF FLUORIDE, METAL OXIDE, AND METAL CARBONATE (MASS % WITH RESPECT TO THE TOTAL MASS OF FLUX-CORED WIRE) | | | | | | Ceq | ($\frac{1}{2}$) × Mn + Ni + 3 × Cr |
|---|---|---|---|---|---|---|---|---|---|
| | | Ti | Nb | B | Ca | REM | OTHERS | | |
| EXAMPLE | A78 | — | — | — | — | — | REMAINDER | 0.58 | 3.42 |
| | A79 | 0.023 | — | 0.0030 | — | — | REMAINDER | 0.61 | 4.03 |
| | A80 | 0.015 | — | 0.0045 | — | — | REMAINDER | 0.64 | 3.58 |
| | A81 | 0.036 | — | — | — | — | REMAINDER | 0.65 | 3.50 |
| | A82 | — | 0.02 | 0.0035 | — | — | REMAINDER | 0.63 | 3.25 |

TABLE 2-6-continued

| | | | | | | | | |
|---|---|---|---|---|---|---|---|---|
| A83 | 0.035 | — | 0.0040 | — | — | REMAINDER | 0.70 | 4.19 |
| A84 | 0.022 | — | 0.0025 | — | — | REMAINDER | 0.60 | 3.10 |
| A85 | — | — | — | — | — | REMAINDER | 0.63 | 3.45 |

TABLE 3

| | WELDING CONDITION | | | | | | |
|---|---|---|---|---|---|---|---|
| TEST ITEMS | CURRENT [A] | VOLTAGE [V] | WELDING SPEED [cm/min] | HEAT INPUT [kJ/cm] | PREHEATING/ INTERPASS TEMPERATURE | SHIELDING GAS | GAS FLOW [L/min] |
| DEPOSITED METAL TEST | 280 | 30 | 30 | 16.8 | PREHEATING: NONE (ROOM TEMPERATURE: 20° C.) INTERPASS TEMPERATURE: 150° C. OR LESS | Ar—20% $CO_2$ | 25 |
| U-GROOVE WELD CRACKING TEST | 280 | 30 | 30 | 16.8 | PREHEATING: NONE(0° C.) | Ar—20% $CO_2$ | 25 |
| DIFFUSIBLE HYDROGEN TEST | 280 | 30 | 30 | 16.8 | — | Ar—20% $CO_2$ | 25 |

TABLE 4-1

| | | RESULT | | | | | |
|---|---|---|---|---|---|---|---|
| | | DEPOSITED METAL | | | U-GROOVE WELD | | |
| CATEGORY | WIRE NO. | AMOUNT OF OXYGEN OF DEPOSITED METAL [ppm] | TENSILE STRENGTH [MPa] | CHARPY ABSORBED ENERGY AT −40° C. [J] | CRACKING EXISTENCE OR NON-EXISTENCE OF CRACKING | AMOUNT OF DIFFUSIBLE HYDROGEN [ml/100 g] | EVALUATION RESULT OF WELDING PERFORMANCE | OVERALL DETERMINATION |
| EXAMPLE | A01 | 321 | 839 | 81 | NON-EXISTENCE | 0.48 | GOOD | PASS |
| EXAMPLE | A02 | 355 | 794 | 87 | NON-EXISTENCE | 0.93 | GOOD | PASS |
| EXAMPLE | A03 | 357 | 872 | 92 | NON-EXISTENCE | 0.18 | GOOD | PASS |
| EXAMPLE | A04 | 385 | 850 | 73 | NON-EXISTENCE | 0.34 | GOOD | PASS |
| EXAMPLE | A05 | 360 | 910 | 74 | NON-EXISTENCE | 0.37 | GOOD | PASS |
| EXAMPLE | A06 | 374 | 899 | 85 | NON-EXISTENCE | 0.23 | GOOD | PASS |
| EXAMPLE | A07 | 351 | 796 | 80 | NON-EXISTENCE | 0.65 | GOOD | PASS |
| EXAMPLE | A08 | 335 | 910 | 82 | NON-EXISTENCE | 0.41 | GOOD | PASS |
| EXAMPLE | A09 | 369 | 905 | 70 | NON-EXISTENCE | 0.67 | GOOD | PASS |
| EXAMPLE | A10 | 370 | 878 | 90 | NON-EXISTENCE | 0.95 | GOOD | PASS |
| EXAMPLE | A11 | 366 | 882 | 75 | NON-EXISTENCE | 0.70 | GOOD | PASS |
| EXAMPLE | A12 | 385 | 872 | 84 | NON-EXISTENCE | 0.21 | GOOD | PASS |
| EXAMPLE | A13 | 322 | 849 | 89 | NON-EXISTENCE | 0.45 | GOOD | PASS |
| EXAMPLE | A14 | 386 | 901 | 72 | NON-EXISTENCE | 0.45 | GOOD | PASS |
| EXAMPLE | A15 | 358 | 860 | 74 | NON-EXISTENCE | 0.40 | GOOD | PASS |
| EXAMPLE | A16 | 343 | 895 | 83 | NON-EXISTENCE | 0.75 | GOOD | PASS |
| EXAMPLE | A17 | 376 | 916 | 82 | NON-EXISTENCE | 0.54 | GOOD | PASS |
| EXAMPLE | A18 | 343 | 922 | 79 | NON-EXISTENCE | 0.37 | GOOD | PASS |
| EXAMPLE | A19 | 374 | 810 | 93 | NON-EXISTENCE | 0.17 | GOOD | PASS |
| EXAMPLE | A20 | 349 | 850 | 78 | NON-EXISTENCE | 0.31 | GOOD | PASS |
| EXAMPLE | A21 | 380 | 863 | 75 | NON-EXISTENCE | 0.40 | GOOD | PASS |
| EXAMPLE | A22 | 381 | 830 | 87 | NON-EXISTENCE | 0.87 | GOOD | PASS |
| EXAMPLE | A23 | 357 | 882 | 84 | NON-EXISTENCE | 0.73 | GOOD | PASS |
| EXAMPLE | A24 | 337 | 855 | 86 | NON-EXISTENCE | 0.46 | GOOD | PASS |
| EXAMPLE | A25 | 340 | 891 | 82 | NON-EXISTENCE | 0.23 | GOOD | PASS |
| EXAMPLE | A26 | 321 | 869 | 84 | NON-EXISTENCE | 0.73 | GOOD | PASS |
| EXAMPLE | A27 | 360 | 805 | 72 | NON-EXISTENCE | 0.57 | GOOD | PASS |
| EXAMPLE | A28 | 349 | 884 | 88 | NON-EXISTENCE | 0.93 | GOOD | PASS |
| EXAMPLE | A29 | 372 | 923 | 82 | NON-EXISTENCE | 0.48 | GOOD | PASS |
| EXAMPLE | A30 | 349 | 906 | 83 | NON-EXISTENCE | 0.39 | GOOD | PASS |
| EXAMPLE | A31 | 328 | 902 | 78 | NON-EXISTENCE | 0.77 | GOOD | PASS |
| EXAMPLE | A32 | 358 | 836 | 91 | NON-EXISTENCE | 0.86 | GOOD | PASS |

TABLE 4-2

| | | RESULT | | | | | | |
|---|---|---|---|---|---|---|---|---|
| | | DEPOSITED METAL | | | U-GROOVE WELD | | | |
| CATEGORY | WIRE NO. | AMOUNT OF OXYGEN OF DEPOSITED METAL [ppm] | TENSILE STRENGTH [MPa] | CHARPY ABSORBED ENERGY AT −40° C. [J] | CRACKING EXISTENCE OR NON-EXISTENCE OF CRACKING | AMOUNT OF DIFFUSIBLE HYDROGEN [ml/100 g] | EVALUATION RESULT OF WELDING PERFORMANCE | OVERALL DETERMINATION |
| EXAMPLE | A33 | 365 | 921 | 75 | NON-EXISTENCE | 0.21 | GOOD | PASS |
| EXAMPLE | A34 | 329 | 843 | 73 | NON-EXISTENCE | 0.94 | GOOD | PASS |
| EXAMPLE | A35 | 350 | 925 | 72 | NON-EXISTENCE | 0.71 | GOOD | PASS |
| EXAMPLE | A36 | 351 | 875 | 81 | NON-EXISTENCE | 0.17 | GOOD | PASS |
| EXAMPLE | A37 | 380 | 825 | 75 | NON-EXISTENCE | 0.59 | GOOD | PASS |
| EXAMPLE | A38 | 382 | 903 | 74 | NON-EXISTENCE | 0.63 | GOOD | PASS |
| EXAMPLE | A39 | 374 | 883 | 72 | NON-EXISTENCE | 0.19 | GOOD | PASS |
| EXAMPLE | A40 | 323 | 859 | 79 | NON-EXISTENCE | 0.19 | GOOD | PASS |
| EXAMPLE | A41 | 351 | 797 | 95 | NON-EXISTENCE | 0.79 | GOOD | PASS |
| EXAMPLE | A42 | 364 | 888 | 85 | NON-EXISTENCE | 0.17 | GOOD | PASS |
| EXAMPLE | A43 | 373 | 887 | 87 | NON-EXISTENCE | 0.74 | GOOD | PASS |
| EXAMPLE | A44 | 370 | 880 | 73 | NON-EXISTENCE | 0.68 | GOOD | PASS |
| EXAMPLE | A45 | 384 | 907 | 71 | NON-EXISTENCE | 0.26 | GOOD | PASS |
| EXAMPLE | A46 | 331 | 908 | 72 | NON-EXISTENCE | 0.34 | GOOD | PASS |
| EXAMPLE | A47 | 370 | 830 | 85 | NON-EXISTENCE | 0.87 | GOOD | PASS |
| EXAMPLE | A48 | 384 | 924 | 71 | NON-EXISTENCE | 0.60 | GOOD | PASS |
| EXAMPLE | A49 | 351 | 918 | 79 | NON-EXISTENCE | 0.73 | GOOD | PASS |
| EXAMPLE | A50 | 356 | 923 | 78 | NON-EXISTENCE | 0.47 | GOOD | PASS |
| EXAMPLE | A51 | 320 | 874 | 84 | NON-EXISTENCE | 0.84 | GOOD | PASS |
| EXAMPLE | A52 | 333 | 844 | 81 | NON-EXISTENCE | 0.47 | GOOD | PASS |
| EXAMPLE | A53 | 332 | 865 | 88 | NON-EXISTENCE | 0.61 | GOOD | PASS |
| EXAMPLE | A54 | 374 | 912 | 78 | NON-EXISTENCE | 0.65 | GOOD | PASS |
| EXAMPLE | A55 | 360 | 912 | 80 | NON-EXISTENCE | 0.42 | GOOD | PASS |
| EXAMPLE | A56 | 330 | 899 | 74 | NON-EXISTENCE | 0.68 | GOOD | PASS |
| EXAMPLE | A57 | 347 | 922 | 72 | NON-EXISTENCE | 0.39 | GOOD | PASS |
| EXAMPLE | A58 | 370 | 833 | 80 | NON-EXISTENCE | 0.20 | GOOD | PASS |
| EXAMPLE | A59 | 363 | 838 | 93 | NON-EXISTENCE | 0.87 | *1 | PASS |
| EXAMPLE | A60 | 368 | 884 | 76 | NON-EXISTENCE | 0.81 | *1 | PASS |
| EXAMPLE | A61 | 336 | 823 | 90 | NON-EXISTENCE | 0.17 | *1 | PASS |
| EXAMPLE | A62 | 372 | 852 | 84 | NON-EXISTENCE | 0.22 | *1 | PASS |

*1 ALTHOUGH AMOUNT OF SPUTTER WAS SLIGHTLY LARGE, ACCEPTABLE

TABLE 4-3

| | | RESULT | | | | | | |
|---|---|---|---|---|---|---|---|---|
| | | DEPOSITED METAL | | | U-GROOVE WELD | | | |
| CATEGORY | WIRE NO. | AMOUNT OF OXYGEN OF DEPOSITED METAL [ppm] | TENSILE STRENGTH [MPa] | CHARPY ABSORBED ENERGY AT −40° C. [J] | CRACKING EXISTENCE OR NON-EXISTENCE OF CRACKING | AMOUNT OF DIFFUSIBLE HYDROGEN [ml/100 g] | EVALUATION RESULT OF WELDING PERFORMANCE | OVERALL DETERMINATION |
| EXAMPLE | A63 | 342 | 789 | 98 | NON-EXISTENCE | 0.68 | GOOD | PASS |
| EXAMPLE | A64 | 358 | 916 | 79 | NON-EXISTENCE | 0.50 | GOOD | PASS |
| EXAMPLE | A65 | 309 | 903 | 81 | NON-EXISTENCE | 0.95 | GOOD | PASS |
| EXAMPLE | A66 | 365 | 824 | 92 | NON-EXISTENCE | 0.55 | GOOD | PASS |
| EXAMPLE | A67 | 312 | 838 | 93 | NON-EXISTENCE | 0.74 | GOOD | PASS |
| EXAMPLE | A68 | 346 | 835 | 91 | NON-EXISTENCE | 0.46 | GOOD | PASS |
| EXAMPLE | A69 | 355 | 848 | 96 | NON-EXISTENCE | 0.54 | GOOD | PASS |
| EXAMPLE | A70 | 372 | 920 | 82 | NON-EXISTENCE | 0.40 | GOOD | PASS |
| EXAMPLE | A71 | 351 | 830 | 95 | NON-EXISTENCE | 0.63 | GOOD | PASS |
| EXAMPLE | A72 | 333 | 877 | 86 | NON-EXISTENCE | 0.65 | GOOD | PASS |
| EXAMPLE | A73 | 365 | 851 | 89 | NON-EXISTENCE | 0.43 | GOOD | PASS |
| EXAMPLE | A74 | 342 | 821 | 92 | NON-EXISTENCE | 0.58 | GOOD | PASS |
| EXAMPLE | A75 | 360 | 869 | 85 | NON-EXISTENCE | 0.48 | GOOD | PASS |
| EXAMPLE | A76 | 354 | 844 | 90 | NON-EXISTENCE | 0.62 | GOOD | PASS |
| EXAMPLE | A77 | 320 | 860 | 88 | NON-EXISTENCE | 0.50 | GOOD | PASS |

TABLE 4-4

| CATEGORY | WIRE NO. | DEPOSITED METAL AMOUNT OF OXYGEN OF DEPOSITED METAL [ppm] | DEPOSITED METAL TENSILE STRENGTH [MPa] | DEPOSITED METAL CHARPY ABSORBED ENERGY AT −40° C. [J] | U-GROOVE WELD CRACKING EXISTENCE OR NON-EXISTENCE OF CRACKING | AMOUNT OF DIFFUSIBLE HYDROGEN [ml/100 g] | EVALUATION RESULT OF WELDING PERFORMANCE | OVERALL DETERMINATION |
|---|---|---|---|---|---|---|---|---|
| COMPARATIVE EXAMPLE | B01 | 386 | 772 | 82 | NON-EXISTENCE | 0.61 | GOOD | FAIL |
| COMPARATIVE EXAMPLE | B02 | 324 | 948 | 65 | NON-EXISTENCE | 0.82 | GOOD | FAIL |
| COMPARATIVE EXAMPLE | B03 | 451 | 814 | 62 | NON-EXISTENCE | 0.52 | GOOD | FAIL |
| COMPARATIVE EXAMPLE | B04 | 364 | 823 | 45 | NON-EXISTENCE | 0.86 | GOOD | FAIL |
| COMPARATIVE EXAMPLE | B05 | 336 | 755 | 84 | NON-EXISTENCE | 0.47 | GOOD | FAIL |
| COMPARATIVE EXAMPLE | B06 | 376 | 938 | 52 | NON-EXISTENCE | 0.79 | GOOD | FAIL |
| COMPARATIVE EXAMPLE | B07 | 372 | 892 | 42 | NON-EXISTENCE | 0.29 | GOOD | FAIL |
| COMPARATIVE EXAMPLE | B08 | 362 | 844 | 50 | NON-EXISTENCE | 0.38 | GOOD | FAIL |
| COMPARATIVE EXAMPLE | B09 | 356 | 917 | 62 | NON-EXISTENCE | 0.73 | GOOD | FAIL |
| COMPARATIVE EXAMPLE | B10 | 333 | 816 | 84 | EXISTENCE (SOLIDIFICATION CRACKING) | 0.94 | GOOD | FAIL |
| COMPARATIVE EXAMPLE | B11 | 586 | 883 | 35 | NON-EXISTENCE | 0.88 | GOOD | FAIL |
| COMPARATIVE EXAMPLE | B12 | 341 | 797 | 59 | NON-EXISTENCE | 0.29 | GOOD | FAIL |
| COMPARATIVE EXAMPLE | B13 | 369 | 770 | 75 | NON-EXISTENCE | 0.50 | GOOD | FAIL |
| COMPARATIVE EXAMPLE | B14 | 353 | 941 | 63 | NON-EXISTENCE | 0.40 | GOOD | FAIL |
| COMPARATIVE EXAMPLE | B15 | 342 | 860 | 51 | NON-EXISTENCE | 0.29 | GOOD | FAIL |
| COMPARATIVE EXAMPLE | B16 | 367 | 842 | 66 | NON-EXISTENCE | 0.74 | GOOD | FAIL |
| COMPARATIVE EXAMPLE | B17 | 382 | 852 | 68 | NON-EXISTENCE | 0.65 | GOOD | FAIL |
| COMPARATIVE EXAMPLE | B18 | 379 | 825 | 55 | NON-EXISTENCE | 0.28 | GOOD | FAIL |
| COMPARATIVE EXAMPLE | B19 | 349 | 887 | 51 | NON-EXISTENCE | 0.57 | GOOD | FAIL |
| COMPARATIVE EXAMPLE | B20 | 382 | 873 | 53 | NON-EXISTENCE | 0.92 | GOOD | FAIL |
| COMPARATIVE EXAMPLE | B21 | NOT EVALUATED DUE TO BAD WELD BEAD SHAPE AND OCCURRENCE OF DEFECT | | | | | | FAIL |
| COMPARATIVE EXAMPLE | B22 | NOT EVALUATED DUE TO BAD WELD BEAD SHAPE AND OCCURRENCE OF DEFECT | | | | | | FAIL |
| COMPARATIVE EXAMPLE | B23 | NOT EVALUATED DUE TO BAD WELD BEAD SHAPE AND OCCURRENCE OF DEFECT | | | | | | FAIL |
| COMPARATIVE EXAMPLE | B24 | NOT EVALUATED DUE TO BAD WELD BEAD SHAPE AND OCCURRENCE OF DEFECT | | | | | | FAIL |
| COMPARATIVE EXAMPLE | B25 | 357 | 986 | 52 | NON-EXISTENCE | 0.64 | GOOD | FAIL |
| COMPARATIVE EXAMPLE | B26 | 340 | 751 | 85 | NON-EXISTENCE | 0.75 | GOOD | FAIL |
| COMPARATIVE EXAMPLE | B27 | 364 | 790 | 65 | NON-EXISTENCE | 0.51 | GOOD | FAIL |
| COMPARATIVE EXAMPLE | B28 | 386 | 965 | 58 | NON-EXISTENCE | 0.54 | GOOD | FAIL |
| COMPARATIVE EXAMPLE | B29 | 368 | 849 | 79 | EXISTENCE | 1.05 | GOOD | FAIL |
| COMPARATIVE EXAMPLE | B30 | NOT EVALUATED DUE TO EXCESSIVE FUME AND OCCURRENCE OF SLAG INCLUSION | | | | | | FAIL |
| COMPARATIVE EXAMPLE | B31 | NOT EVALUATED DUE TO UNSTABLE ARC AND BAD WELD BEAD SHAPE | | | | | | FAIL |
| COMPARATIVE EXAMPLE | B32 | 415 | 865 | 58 | NON-EXISTENCE | 0.95 | GOOD | FAIL |
| COMPARATIVE EXAMPLE | B33 | NOT EVALUATED DUE TO EXCESSIVE AMOUNT OF SPUTTER AND BAD WELD BEAD SHAPE | | | | | | FAIL |

TABLE 4-4-continued

| | | RESULT | | | | | |
|---|---|---|---|---|---|---|---|
| | | DEPOSITED METAL | | U-GROOVE | | | |
| CATEGORY | WIRE NO. | AMOUNT OF OXYGEN OF DEPOSITED METAL [ppm] | TENSILE STRENGTH [MPa] | CHARPY ABSORBED ENERGY AT −40° C. [J] | WELD CRACKING EXISTENCE OR NON-EXISTENCE OF CRACKING | AMOUNT OF DIFFUSIBLE HYDROGEN [ml/100 g] | EVALUATION RESULT OF WELDING PERFORMANCE | OVERALL DETERMINATION |
| COMPARATIVE EXAMPLE | B34 | NOT EVALUATED DUE TO BAD WELD BEAD SHAPE | | | | | | FAIL |
| COMPARATIVE EXAMPLE | B35 | 426 | 830 | 62 | NON-EXISTENCE | 0.86 | GOOD | FAIL |
| | B36 | NOT EVALUATED DUE TO UNSTABLE ARC AND BAD WELD BEAD SHAPE | | | | | | FAIL |

TABLE 4-5

| | | RESULT | | | | | | |
|---|---|---|---|---|---|---|---|---|
| | | DEPOSITED METAL | | | U-GROOVE WELD | | | |
| CATEGORY | WIRE NO. | AMOUNT OF OXYGEN OF DEPOSITED METAL [ppm] | TENSILE STRENGTH [MPa] | CHARPY ABSORBED ENERGY AT −40° C. [J] | CRACKING EXISTENCE OR NON-EXISTENCE OF CRACKING | AMOUNT OF DIFFUSIBLE HYDROGEN [ml/100 g] | EVALUATION RESULT OF WELDING PERFORMANCE | OVERALL DETERMINATION |
| COMPARATIVE EXAMPLE | B37 | 742 | 825 | 41 | EXISTENCE | 5.32 | GOOD | FAIL |
| COMPARATIVE EXAMPLE | B38 | 588 | 783 | 54 | EXISTENCE | 4.37 | GOOD | FAIL |
| COMPARATIVE EXAMPLE | B39 | 283 | 806 | 73 | EXISTENCE | 2.82 | GOOD | FAIL |
| COMPARATIVE EXAMPLE | B40 | 269 | 799 | 78 | EXISTENCE | 3.16 | GOOD | FAIL |
| COMPARATIVE EXAMPLE | B41 | 269 | 904 | 46 | EXISTENCE | 1.96 | AMOUNT OF SPUTTER WAS LARGE | FAIL |
| COMPARATIVE EXAMPLE | B42 | 245 | 986 | 38 | EXISTENCE | 2.24 | AMOUNT OF SPUTTER WAS LARGE | FAIL |
| COMPARATIVE EXAMPLE | B43 | 288 | 846 | 63 | EXISTENCE | 1.44 | GOOD | FAIL |
| COMPARATIVE EXAMPLE | B44 | 265 | 889 | 58 | EXISTENCE | 1.79 | GOOD | FAIL |

TABLE 4-6

| | | RESULT | | | | | | |
|---|---|---|---|---|---|---|---|---|
| | | DEPOSITED METAL | | | U-GROOVE WELD | | | |
| CATEGORY | WIRE NO. | AMOUNT OF OXYGEN OF DEPOSITED METAL [ppm] | TENSILE STRENGTH [MPa] | CHARPY ABSORBED ENERGY AT −40° C. [J] | CRACKING EXISTENCE OR NON-EXISTENCE OF CRACKING | AMOUNT OF DIFFUSIBLE HYDROGEN [ml/100 g] | EVALUATION RESULT OF WELDING PERFORMANCE | OVERALL DETERMINATION |
| EXAMPLE | A78 | 364 | 821 | 90 | NON-EXISTENCE | 0.56 | GOOD | PASS |
| EXAMPLE | A79 | 342 | 839 | 79 | NON-EXISTENCE | 0.64 | GOOD | PASS |
| EXAMPLE | A80 | 376 | 842 | 87 | NON-EXISTENCE | 0.42 | GOOD | PASS |
| EXAMPLE | A81 | 352 | 859 | 86 | NON-EXISTENCE | 0.72 | GOOD | PASS |
| EXAMPLE | A82 | 339 | 842 | 81 | NON-EXISTENCE | 0.68 | GOOD | PASS |
| EXAMPLE | A83 | 367 | 888 | 74 | NON-EXISTENCE | 0.82 | GOOD | PASS |
| EXAMPLE | A84 | 379 | 857 | 72 | NON-EXISTENCE | 0.44 | *2 | PASS |
| EXAMPLE | A85 | 351 | 849 | 83 | NON-EXISTENCE | 0.89 | GOOD | PASS |

The invention claimed is:

1. A flux-cored wire comprising:
   an outer steel sheath; and
   a flux with which the outer steel sheath is filled, wherein:
   one or more of a fluoride of $CaF_2$, $BaF_2$, $SrF_2$, $MgF_2$, and LiF are included in the flux, wherein a total amount thereof is defined as $\alpha$, and $\alpha$ is 3.3 to 6.0% in terms of mass % with respect to a total mass of the flux-cored wire, and a ratio of an amount of the $CaF_2$ with respect to the $\alpha$ is 0.89 or more,
   one or more of a metal oxide of a Ti oxide, a Si oxide, a Zr oxide, a Mg oxide, and an Al oxide are included in the flux and, a total amount thereof is defined as $\beta$, wherein $\beta$ is 0.4 to 1.2% in terms of mass % with respect to the total mass of the flux-cored wire,
   one or more of a metal carbonate of $CaCO_3$, $BaCO_3$, $SrCO_3$, $MgCO_3$, and $Li_2CO_3$ are included in the flux and a total amount thereof is 0.1 to 0.5% in terms of mass % with respect to the total mass of the flux-cored wire,
   an amount of an iron powder in the flux is less than 10% in terms of mass % with respect to the total mass of the flux-cored wire,
   a chemical composition excluding the fluoride, the metal oxide, and the metal carbonate includes, in terms of mass % with respect to the total mass of the flux-cored wire,
   C: 0.04 to 0.09%;
   Si: 0.3 to 1.0%;
   Mn: 1.0 to 2.5%;
   Al: 0.001 to 0.050%;
   Ni: 1.5 to 3.5%;
   V: 0 to 0.04%;
   P: 0.02% or less;
   S: 0.02% or less;
   Cu: 0 to 0.5%;
   Cr: 0 to 0.5%;
   Mo: 0.3 to 1.0%;
   Ti: 0 to 0.30%;
   Nb: 0 to 0.10%;
   B: 0 to 0.0100%;
   Ca: 0 to 0.50%;
   REM: 0 to 0.0100%; and
   a remainder including Fe and an impurity,
   a Ceq defined by Expression A is 0.60 to 0.75 mass %,
   a TE defined by Expression B is 2.9 to 4.4 mass %, $$Ceq = \text{``C''} + \text{``Si''}/24 + \text{``Mn''}/6 + \text{``Ni''}/40 + \text{``Cr''}/5 + \text{``Mo''}/4 + \text{``V''}/14: \quad \text{Expression A,}$$

$$TE = \text{``Mn''}/2 + \text{``Ni''} + 3 \times \text{``Cr''}: \quad \text{Expression B, and}$$

elements to which double quote is attached express amounts of the elements in terms of mass %, respectively.

2. The flux-cored wire according to claim 1, wherein an amount of CaO in the flux-cored wire is 0.15% or less in terms of mass % with respect to the total mass of the flux-cored wire.

3. The flux-cored wire according to claim 1 or 2, wherein the ratio of an amount of the $CaF_2$ with respect to the $\alpha$ is 0.90 or more.

4. The flux-cored wire according to claim 1 or 2, wherein a ratio of the $\alpha$ with respect to the $\beta$ is 3.1 to 15.0.

5. The flux-cored wire according to claim 1 or 2, wherein a tensile strength of a deposited metal is 780 to 940 MPa in a tensile test to the deposited metal regulated in Japanese Industrial Standards JIS Z 3111-2005 with respect to a gas-shielded arc welding using the flux-cored wire.

6. The flux-cored wire according to claim 1 or 2, wherein the outer steel sheath has a seamless shape.

7. The flux-cored wire according to claim 1 or 2, wherein a perfluoropolyether oil is applied on a surface of the flux-cored wire.

8. A welding method, comprising:
   welding a steel with a flux-cored wire, and with a pure Ar gas, a pure carbon dioxide, or a mixed gas of Ar and 3 to 30 volume % of $CO_2$ as a shielding gas,
   wherein the flux-cored wire comprises an outer steel sheath and a flux with which the outer steel sheath is filled,
   wherein:
   one or more of a fluoride of $CaF_2$, $BaF_2$, $SrF_2$, $MgF_2$, and LiF are included in the flux, wherein a total amount thereof is defined as $\alpha$, and $\alpha$ is 3.3 to 6.0% in terms of mass % with respect to a total mass of the flux-cored wire, and a ratio of an amount of the $CaF_2$ with respect to the $\alpha$ is 0.89 or more,
   one or more of a metal oxide of a Ti oxide, a Si oxide, a Zr oxide, a Mg oxide, and an Al oxide are included in the flux and a total amount thereof is defined as $\beta$, wherein $\beta$ is 0.4 to 1.2% in terms of mass % with respect to the total mass of the flux-cored wire,
   one or more of a metal carbonate of $CaCO_3$, $BaCO_3$, $SrCO_3$, $MgCO_3$, and $Li_2CO_3$ are included in the flux and a total amount thereof is 0.1 to 0.5% in terms of mass % with respect to the total mass of the flux-cored wire,
   an amount of an iron powder in the flux is less than 10% in terms of mass % with respect to the total mass of the flux-cored wire,
   a chemical composition, excluding the fluoride, the metal oxide, and the metal carbonate, includes, in terms of mass % with respect to the total mass of the flux-cored wire,
   C: 0.04 to 0.09%;
   Si: 0.3 to 1.0%;
   Mn: 1.0 to 2.5%;
   Al: 0.001 to 0.050%;
   Ni: 1.5 to 3.5%;
   V: 0 to 0.04%;
   P: 0.02% or less;
   S: 0.02% or less;
   Cu: 0 to 0.5%;
   Cr: 0 to 0.5%;
   Mo: 0.3 to 1.0%;
   Ti: 0 to 0.30%;
   Nb: 0 to 0.10%;
   B: 0 to 0.0100%;
   Ca: 0 to 0.50%;
   REM: 0 to 0.0100%; and
   a remainder including Fe and an impurity,
   a Ceq defined by Expression A is 0.60 to 0.75 mass %,
   a TE defined by Expression B is 2.9 to 4.4 mass %, $$Ceq = \text{``C''} + \text{``Si''}/24 + \text{``Mn''}/6 + \text{``Ni''}/40 + \text{``Cr''}/5 + \text{``Mo''}/4 + \text{``V''}/14: \quad \text{Expression A,}$$

$$TE = \text{``Mn''}/2 + \text{``Ni''} + 3 \times \text{``Cr''}: \quad \text{Expression B, and}$$

elements to which double quote is attached express amounts of the elements in terms of mass %, respectively.

9. A method for manufacturing a weld joint, comprising welding a steel with a flux-cored wire, and with a pure Ar gas, a pure carbon dioxide, or a mixed gas of Ar and 3 to 30 volume % of $CO_2$ as a shielding gas, wherein the flux-cored wire comprises an outer steel sheath and a flux with which the outer steel sheath is filled, wherein:

one or more of a fluoride of $CaF_2$, $BaF_2$, $SrF_2$, $MgF_2$, and LiF are included in the flux, wherein a total amount thereof is defined as α, and α is 3.3 to 6.0% in terms of mass % with respect to a total mass of the flux-cored wire, and a ratio of an amount of the $CaF_2$ with respect to the α is 0.89 or more, one or more of a metal oxide of a Ti oxide, a Si oxide, a Zr oxide, a Mg oxide, and an Al oxide are included in the flux and a total amount thereof is defined as β, wherein β is 0.4 to 1.2% in terms of mass % with respect to the total mass of the flux-cored wire, one or more of a metal carbonate of $CaCO_3$, $BaCO_3$, $SrCO_3$, $MgCO_3$, and $Li_2CO_3$ are included in the flux and a total amount thereof is 0.1 to 0.5% in terms of mass % with respect to the total mass of the flux-cored wire, an amount of an iron powder in the flux is less than 10% in terms of mass % with respect to the total mass of the flux-cored wire, a chemical composition excluding the fluoride, the metal oxide, and the metal carbonate includes, in terms of mass % with respect to the total mass of the flux-cored wire, C: 0.04 to 0.09%;
Si: 0.3 to 1.0%;
Mn: 1.0 to 2.5%;
Al: 0.001 to 0.050%;
Ni: 1.5 to 3.5%:
V: 0 to 0.04%;
P: 0.02% or less;
S: 0.02% or less;
Cu: 0 to 0.5%;
Cr: 0 to 0.5%;
Mo: 0.3 to 1.0%;
Ti: 0 to 0.30%;
Nb: 0 to 0.10%;
B: 0 to 0.0100%;
Ca: 0 to 0.50%;
REM: 0 to 0.0100%; and
a remainder including Fe and an impurity,
a Ceq defined by Expression A is 0.60 to 0.75 mass %,
a TE defined by Expression B is 2.9 to 4.4 mass %, Ceq="C"+"Si"/24+"Mn"/6+"Ni"/40+"Cr"/5+"Mo"/4+"V"/14:   Expression A, TE="Mn"/2+"Ni"+3×"Cr":   Expression B, and elements to which double quote is attached express amounts of the elements in terms of mass %, respectively;

wherein a thickness of the steel is 3 to 100 mm, and a tensile strength of the steel is 780 MPa or more.

10. A weld joint, comprising a steel plate and a weld metal, manufactured by the method for manufacturing a weld joint according to claim 9.

11. The weld joint according to claim 10, wherein
an amount of a diffusible hydrogen in the weld metal is less than 1.0 ml/100 g,
an amount of an oxygen in the weld metal is 300 to 400 ppm,
tensile strength of the weld metal is 780 to 940 MPa, and
a charpy absorbed energy at −40° C. of the weld metal is 86 J/cm² or more.

12. The flux-cored wire according to claim 1 or 2, wherein
the chemical composition, excluding the fluoride, the metal oxide, and the metal carbonate, includes, in terms of mass % with respect to the total mass of the flux-cored wire,
V: 0 to 0.03%.

13. The welding method according to claim 8, wherein
the chemical composition, excluding the fluoride, the metal oxide, and the metal carbonate, includes, in terms of mass % with respect to the total mass of the flux-cored wire,
V: 0 to 0.03%.

14. The method for manufacturing a weld joint according to claim 9, wherein
the chemical composition, excluding the fluoride, the metal oxide, and the metal carbonate, includes, in terms of mass % with respect to the total mass of the flux-cored wire,
V: 0 to 0.03%.

15. The welding method according to claim 8, wherein
an amount of CaO in the flux-cored wire is 0.15% or less in terms of mass % with respect to the total mass of the flux-cored wire.

16. The welding method according to claim 8 or 15, wherein
the ratio of an amount of the $CaF_2$ with respect to the α is 0.90 or more.

17. The welding method according to claim 8 or 15, wherein
a ratio of the α with respect to the β is 3.1 to 15.0.

18. The method for manufacturing a weld joint according to claim 9, wherein
an amount of CaO in the flux-cored wire is 0.15% or less in terms of mass % with respect to the total mass of the flux-cored wire.

19. The method for manufacturing a weld joint according to claim 9 or 18, wherein
the ratio of an amount of the $CaF_2$ with respect to the α is 0.90 or more.

20. The method for manufacturing a weld joint according to claim 9 or 18, wherein
a ratio of the α with respect to the β is 3.1 to 15.0.

* * * * *